United States Patent
Shioya et al.

(10) Patent No.: US 11,374,884 B2
(45) Date of Patent: *Jun. 28, 2022

(54) MANAGING AND DISPLAYING ONLINE MESSAGES ALONG TIMELINES

(71) Applicant: International Business Machines Corporation, Armonk, NY (US)

(72) Inventors: Tomohiro Shioya, Tokyo (JP); Fumihiko Terui, Tokyo (JP); Mihoko Hasegawa, Tokyo (JP); Hirofumi Nishikawa, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 171 days.

This patent is subject to a terminal disclaimer.

(21) Appl. No.: 16/737,985

(22) Filed: Jan. 9, 2020

(65) Prior Publication Data

US 2020/0145353 A1 May 7, 2020

Related U.S. Application Data

(63) Continuation of application No. 15/667,996, filed on Aug. 3, 2017, now Pat. No. 10,574,601.

(51) Int. Cl.
*H04L 51/043* (2022.01)
*H04L 51/00* (2022.01)
(Continued)

(52) U.S. Cl.
CPC ............ *H04L 51/043* (2013.01); *H04L 51/04* (2013.01); *H04L 51/10* (2013.01); *H04L 51/12* (2013.01); *H04L 51/16* (2013.01); *H04L 51/32* (2013.01)

(58) Field of Classification Search
CPC ....... H04L 51/043; H04L 51/10; H04L 51/12; H04L 51/16
See application file for complete search history.

(56) References Cited

U.S. PATENT DOCUMENTS

| 6,393,460 B1 | 5/2002 | Gruen et al. |
| 8,806,361 B1 | 8/2014 | Noel et al. |

(Continued)

FOREIGN PATENT DOCUMENTS

| JP | 2007042137 A | 2/2007 |
| JP | 2014056294 A | 3/2014 |

(Continued)

OTHER PUBLICATIONS

Nevase et al., "Timeline Generation for Progressive Tweet Stream", International Journal of Advanced Research in Computer and Communication Engineering, vol. 5, Issue 6, Jun. 2016, Copyright IJARCCE, DOI 10.17148/IJARCCE.2016.56154, 3 pages.

(Continued)

*Primary Examiner* — Douglas B Blair
(74) *Attorney, Agent, or Firm* — Jared Chaney

(57) ABSTRACT

The present invention provides a method, system, and computer program product of managing and displaying online messages along timelines. In an embodiment, the present invention includes receiving a plurality of online messages from an online website, determining sets of similar online messages among the plurality of online messages, and displaying on a computer display each of the sets of similar online messages along a graphical representation of a timeline corresponding to the each of the sets of similar online messages, resulting in displayed timelines and displayed online messages. In a further embodiment, the present invention includes in response to receiving a new online message from the online website, determining each set among the sets of similar online messages to which the new online message is similar, and displaying on the computer display the new online message, resulting in a displayed new online message.

17 Claims, 18 Drawing Sheets

(51) Int. Cl.
*H04L 51/10* (2022.01)
*H04L 51/52* (2022.01)
*H04L 51/04* (2022.01)

(56) References Cited

U.S. PATENT DOCUMENTS

| | | | |
|---|---|---|---|
| 9,195,635 B2 | 11/2015 | Liu et al. | |
| 9,299,113 B2 | 3/2016 | Alonso et al. | |
| 9,515,891 B2* | 12/2016 | Ickman | G06F 3/04845 |
| 10,162,900 B1* | 12/2018 | Chatterjee | G06F 16/248 |
| 10,171,386 B1 | 1/2019 | Pendap et al. | |
| 10,262,301 B2* | 4/2019 | Photowat | G06Q 30/0252 |
| 10,389,673 B2* | 8/2019 | Kursun | H04L 51/34 |
| 10,574,601 B2* | 2/2020 | Shioya | H04L 51/04 |
| 11,145,275 B2* | 10/2021 | Greco | G06F 3/0482 |
| 2010/0119053 A1* | 5/2010 | Goeldi | G06Q 30/0251 |
| | | | 379/265.09 |
| 2011/0021250 A1* | 1/2011 | Ickman | G06F 3/0482 |
| | | | 455/566 |
| 2011/0040760 A1* | 2/2011 | Fleischman | G06F 3/048 |
| | | | 707/737 |
| 2012/0246054 A1* | 9/2012 | Sastri | G06Q 10/04 |
| | | | 705/37 |
| 2014/0129559 A1* | 5/2014 | Estes | G06F 16/245 |
| | | | 707/737 |
| 2014/0129971 A1* | 5/2014 | King | G06F 16/447 |
| | | | 715/772 |
| 2014/0236931 A1* | 8/2014 | Smith | H04L 67/22 |
| | | | 707/722 |
| 2014/0343990 A1* | 11/2014 | Photowat | G06Q 30/0252 |
| | | | 705/7.17 |
| 2015/0186929 A1* | 7/2015 | Thies | G06Q 30/0267 |
| | | | 705/14.45 |
| 2016/0094505 A1 | 3/2016 | Taylor et al. | |
| 2017/0161272 A1* | 6/2017 | Tada | G06F 16/435 |
| 2017/0169800 A1* | 6/2017 | Greco | G06F 3/04845 |
| 2018/0024702 A1* | 1/2018 | Noel | G06F 16/2477 |
| | | | 715/771 |
| 2018/0067910 A1* | 3/2018 | Alonso | G06Q 50/01 |
| 2018/0241702 A1 | 8/2018 | Liu | |
| 2019/0044898 A1 | 2/2019 | Shioya et al. | |
| 2019/0327198 A1* | 10/2019 | Connor | H04L 51/32 |

FOREIGN PATENT DOCUMENTS

| | | |
|---|---|---|
| JP | 2015517133 A | 6/2015 |
| WO | 02093414 A1 | 11/2002 |

OTHER PUBLICATIONS

Mell et al., "The NIST Definition of Cloud Computing," Recommendations of the National Institute of Standards and Technology, U.S. Department of Commerce, Special Publication 800-145, Dated Sep. 2011, 7 pages.

List of IBM Patents or Patent Applications Treated as Related, Dated Jan. 7, 2020, 2 pages.

* cited by examiner

FIG. 6D

MANAGING AND DISPLAYING ONLINE MESSAGES ALONG TIMELINES

BACKGROUND

The present disclosure relates to online messages, and more specifically, to managing and displaying online messages along timelines.

SUMMARY

The present invention provides a computer implemented method, a system, and a computer program product of managing and displaying online messages along timelines. In an exemplary embodiment, the computer implemented method, the system, and the computer program product include (1) receiving, by a computer system, a plurality of online messages from an online website, (2) executing, by the computer system, a set of logical operations determining sets of similar online messages among the plurality of online messages, and (3) displaying, by the computer system, on a computer display each of the sets of similar online messages along a graphical representation of a timeline corresponding to the each of the sets of similar online messages, resulting in displayed timelines and displayed online messages. In a further embodiment, the computer implemented method, the system, and the computer program product further include (a) in response to receiving, by the computer system, a new online message from the online website, executing, by the computer system, a set of logical operations determining each set among the sets of similar online messages to which the new online message is similar, and (b) in response to determining, by the computer system, the each set among the sets of similar online messages to which the new online message is similar, displaying, by the computer system, on the computer display the new online message, resulting in a displayed new online message.

BRIEF DESCRIPTION OF THE DRAWINGS

FIG. 6D depicts a graphical display in accordance with an embodiment of the present invention.

DETAILED DESCRIPTION

Figure 1A:
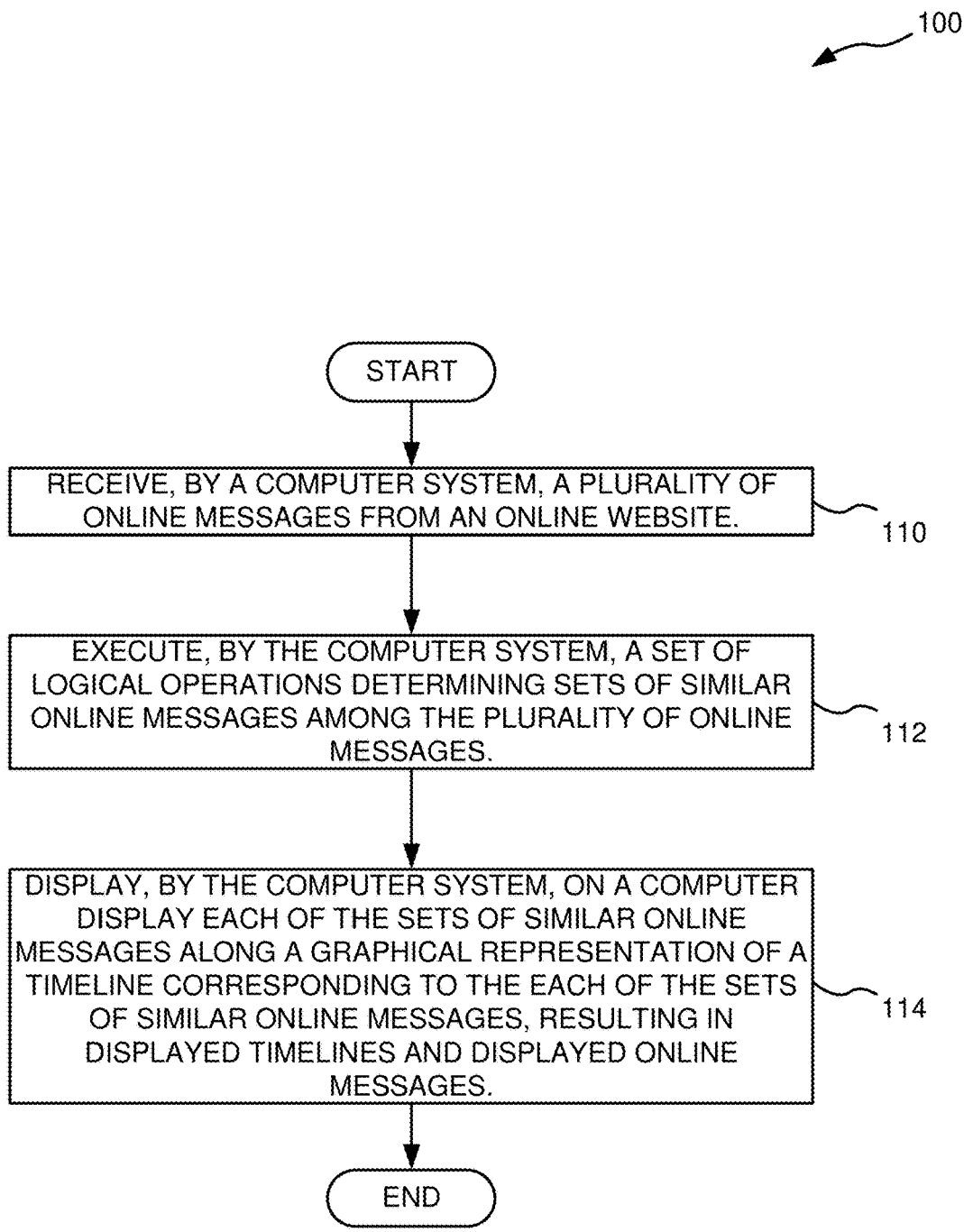
FIG. 1A depicts a flowchart in accordance with an exemplary embodiment of the present invention.

The present invention provides a computer implemented method, a system, and a computer program product of managing and displaying online messages along timelines. In an exemplary embodiment, the computer implemented method, the system, and the computer program product include (1) receiving, by a computer system, a plurality of online messages from an online website, (2) executing, by the computer system, a set of logical operations determining sets of similar online messages among the plurality of online messages, and (3) displaying, by the computer system, on a computer display each of the sets of similar online messages along a graphical representation of a timeline corresponding to the each of the sets of similar online messages, resulting in displayed timelines and displayed online messages. In a further embodiment, the computer implemented method, the system, and the computer program product further include (a) in response to receiving, by the computer system, a new online message from the online website, executing, by the computer system, a set of logical operations determining each set among the sets of similar online messages to which the new online message is similar, and (b) in response to determining, by the computer system, the each set among the sets of similar online messages to which the new online message is similar, displaying, by the computer system, on the computer display the new online message, resulting in a displayed new online message. In an embodiment, the computer system includes a digital telephone/smartphone. In a particular embodiment, the computer system is a digital telephone/smartphone. In an embodiment, the computer system includes a tablet computer system. In a particular embodiment, the computer system is a tablet computer system. In an embodiment, the online messages include online text messages. In an embodiment, the online messages are online text messages. In an embodiment, the online messages include online chat messages. In an embodiment, the online messages are online chat messages. In an embodiment, the online messages include online blog posts. In an embodiment, the online messages are online blog posts. In an embodiment, the online messages include online microblog posts. In an embodiment, the online messages are online microblog posts.

Definitions

Online Chat

Online chat refers to any kind of communication over the internet that offers a real-time transmission of text messages/online messages from a sender to a receiver. Chat messages/online messages are generally short in order to enable other participants to respond quickly, thereby creating a feeling similar to a spoken conversation, which distinguishes chatting from other text-based online communication forms such as Internet forums and email. Online chat may address point-to-point communications as well as multicast communications from one sender to many receivers and voice and video chat, or may be a feature of a web conferencing service. Online chat may be any direct text-based or video-based (webcams), one-on-one chat or one-to-many group chat, using tools such as instant messengers, internet relay chat (IRC), talkers and possibly multi-user domains (MUDs). Online chat may include web-based applications that allow communication, often directly addressed, but anonymous between users in a multi-user environment.

Blogs

A blog is a discussion or informational website published on the internet consisting of discrete, often informal diary-style text entries ("posts")/online messages, where posts are typically displayed in reverse chronological order, so that the most recent post appears first, at the top of a web page. Multi-author blogs (MABs) are blogs with posts written by large numbers of authors. Many blogs provide commentary on a particular subject or topic, ranging from politics to sports, while other blogs function as more personal online diaries, and while other blogs function more as online brand advertising of a particular individual or company. A typical blog combines text, digital images, and links to other blogs, web pages, and other media related to its topic. Most blogs are primarily textual.

Microblogs

Microblogging is a broadcast medium that exists in the form of blogging, where a microblog differs from a traditional blog in that its content is typically smaller in both actual and aggregated file size. Microblogs may allow users to exchange small elements of content, such as short sentences, individual images, or video links. Such small messages are sometimes called microposts. Microbloggers post about topics ranging from the simple, such as "what I'm doing right now," to the thematic, such as "sports cars." Commercial microblogs also exist to promote websites, services and products, and to promote collaboration within an organization. Some microblogging services offer features such as privacy settings, which allow users to control who can read their microblogs, or alternative ways of publishing entries besides the web-based interface, such as text messaging, instant messaging, E-mail, digital audio or digital video.

Clustering

Clustering or cluster analysis is the task of grouping a set of objects in such a way that objects in the same group (called a cluster) are more similar (in some sense or another) to each other than to those in other groups (clusters). Clustering may be achieved by various algorithms that differ significantly in their notion of what constitutes a cluster and how to efficiently find them, where popular notions of clusters include groups with small distances among the cluster members, dense areas of the data space, intervals or particular statistical distributions. Clustering may be formulated as a multi-objective optimization problem such that the appropriate clustering algorithm and parameter settings (including values such as the distance function to use, a density threshold or the number of expected clusters) depend on the individual data set and intended use of the results. Clustering is an iterative process of knowledge discovery or interactive multi-objective optimization that involves trial and failure such that it is often necessary to modify data preprocessing and model parameters until the result achieves the desired properties.

Need for Managing Timelines

In chatting applications (apps) or microblogs, it may be advantageous to display a set or group of messages or posts on one timeline, in order to ensure high visibility with a wide display area. In particular, in a conversation among many speakers, multiple topics may be discussed simultaneously and/or concurrently. However, since multiple topics may reside in one and the same timeline, it is not effective in this situation to trace the contexts of the discussions.

Figure 1B:
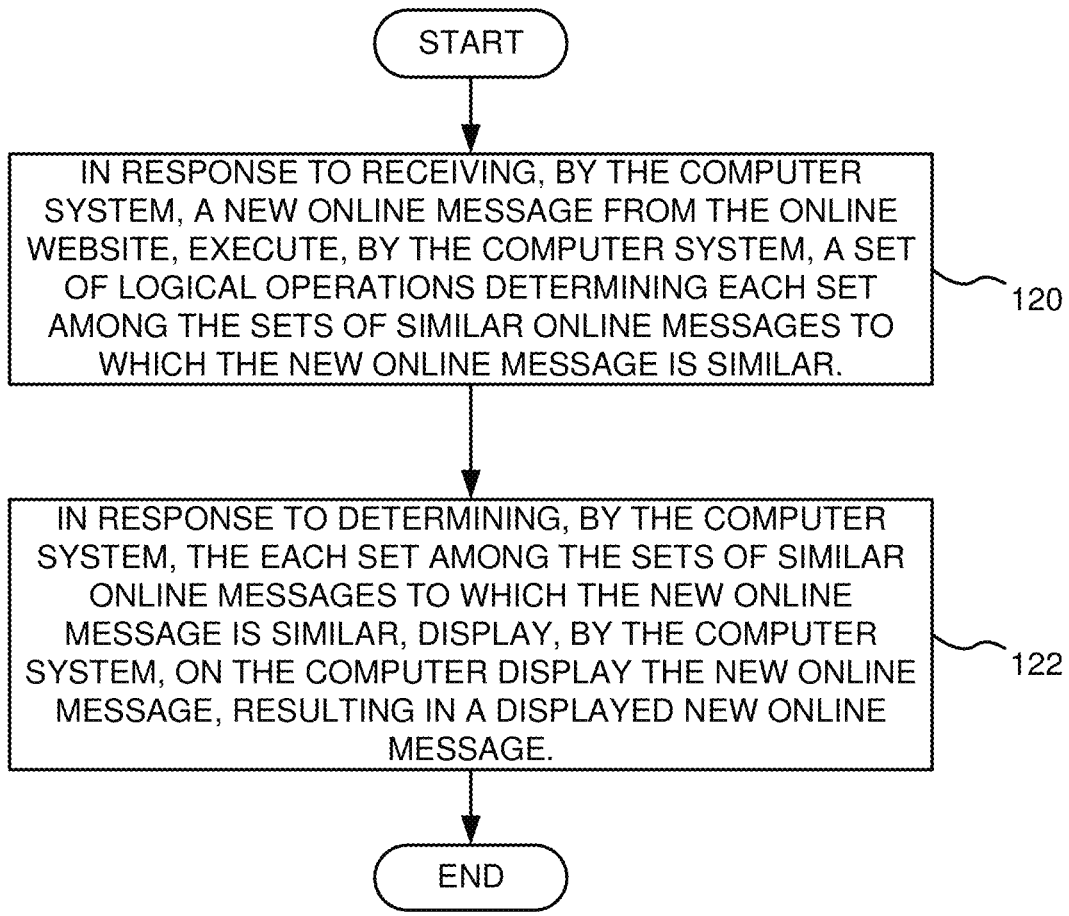
FIG. 1B depicts a flowchart in accordance with an exemplary embodiment of the present invention.

Referring to FIG. 1A, in an exemplary embodiment, the present invention is configured to perform an operation 110 of receiving, by a computer system, a plurality of online messages from an online website, an operation 112 of executing, by the computer system, a set of logical operations determining sets of similar online messages among the plurality of online messages, and an operation 114 of displaying, by the computer system, on a computer display each of the sets of similar online messages along a graphical representation of a timeline corresponding to the each of the sets of similar online messages, resulting in displayed timelines and displayed online messages. Referring to FIG. 1B, in a further embodiment, the present invention is further configured to perform an operation 120 of in response to receiving, by the computer system, a new online message from the online website, executing, by the computer system, a set of logical operations determining each set among the sets of similar online messages to which the new online message is similar, and an operation 122 of in response to determining, by the computer system, the each set among the sets of similar online messages to which the new online message is similar, displaying, by the computer system, on the computer display the new online message, resulting in a displayed new online message.

In an embodiment, the present invention automatically recognizes multiple topics on one single timeline and determines the topics with which the respective posts are associated on a per-post basis. For example, the present invention could allow the topic with which a post is associated to be manually edited, and could use the edited topics in training as feedback from users. Additionally, the present invention could display the respective posts such that the topic (or topics) with which they are associated could be viewed. In an embodiment, when the present invention determines that number of topics exceeds a predetermined number or when the present invention finds a topic whose correlation becomes low, the present invention provides a suggestion to the user to urge him/her to move the post or posts to another independent timeline. Specifically, the present invention could allow a topic (or topics) manually selected to be moved to another independent timeline, where the topic or topics could be used in training as feedback from the users. In an embodiment, the present invention organizes and displays similar/related posts/online messages/speeches in one single channel. Also, the present invention could organize topics/posts/online messages in accordance with the proximity of the content of the topics.

In an embodiment, the present invention analyzes multiple pieces of content that have been posted on an online website, and calculates their correlations with posts preceding a certain post. For example, the present invention could cluster posts that are already posted such that the proximity of a new post or posts to a cluster of posts or clusters of posts may be defined as a correlation. Also, for example, the present invention could create a tree structure from a series of posts having high correlations. In a further example, the present invention could suggest to the user to move the post or posts to another independent timeline when many branches are created in the tree structure or when there is only a weak correlation between such trees.

In an embodiment, the present invention processes posts/online messages individually and chronologically using the tree structures obtained as the result of the analysis. For example, the present invention could read a new post and could display the new post at the end of a similar timeline. Also, for example, the present invention could extend existing lanes/timelines/graphical representations of timelines in the last post until they reach the new post and display an icon on the lane to which the new post is related. In a further embodiment, the present invention updates the representation of the lanes is updated when the state of the branches of the tree structure has been changed.

Figure 7:
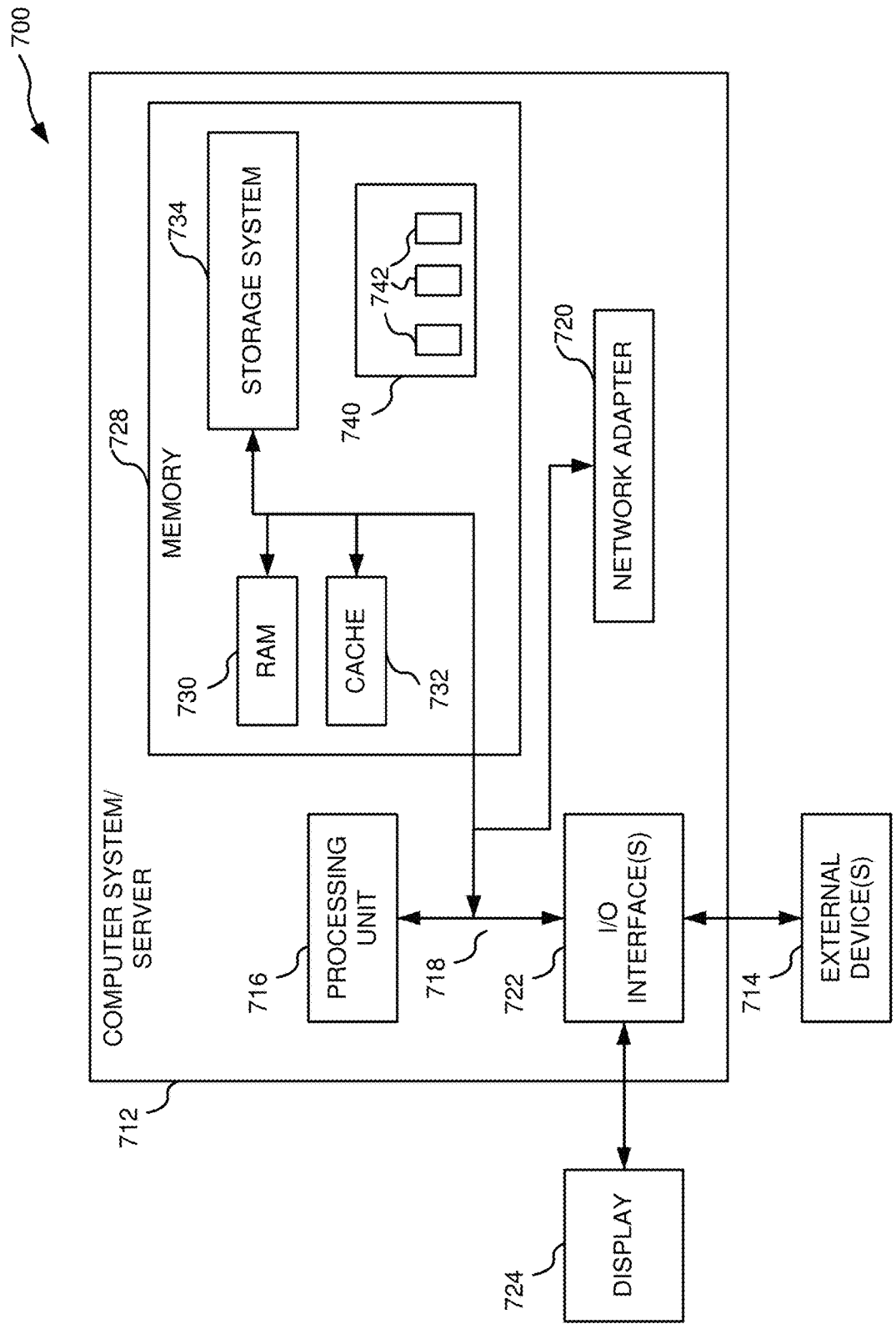
FIG. 7 depicts a computer system in accordance with an exemplary embodiment of the present invention.

In an exemplary embodiment, the computer system is a standalone computer system, such as computer system 700 shown in FIG. 7, a network of distributed computers, where at least some of the computers are computer systems such as computer system 700 shown in FIG. 7, or a cloud computing node server, such as computer system 700 shown in FIG. 7. In an embodiment, the computer system is a computer system 700 as shown in FIG. 7, that executes a managing and displaying online messages along timelines script or computer software application that carries out the operations of at least method 100. In an embodiment, the computer system is a computer system/server 712 as shown in FIG. 7, that executes a managing and displaying online messages along timelines script or computer software application that carries out the operations of at least method 100. In an embodiment, the computer system is a processing unit 716 as shown in FIG. 7, that executes a managing and displaying online messages along timelines script or computer software application that carries out the operations of at least method 100. In an embodiment, the computer system is a computer system 700 as shown in FIG. 7, that executes a managing and displaying online messages along timelines script or computer software application that carries out at least operations 110, 112, and 114. In an embodiment, the computer system is a computer system 700 as shown in FIG. 7, that executes a managing and displaying online messages along timelines script or computer software application that carries out at least operations 120 and 122. In an embodiment, the computer system is a computer system/server 712 as shown in FIG. 7, that executes a managing and displaying online messages along timelines script or computer software application that carries out at least operations 110, 112, and 114. In an embodiment, the computer system is a computer system/server 712 as shown in FIG. 7, that executes a managing and displaying online messages along timelines script or computer software application that carries out at least operations 120 and 124. In an embodiment, the computer system is a processing unit 716 as shown in FIG. 7, that executes a managing and displaying online messages along timelines script or computer software application that carries out at least operations 110, 112, and 114. In an embodiment, the computer system is a processing unit 716 as shown in FIG. 7, that executes a managing and displaying online messages along timelines script or computer software application that carries out at least operations 120 and 124.

Figure 1C:
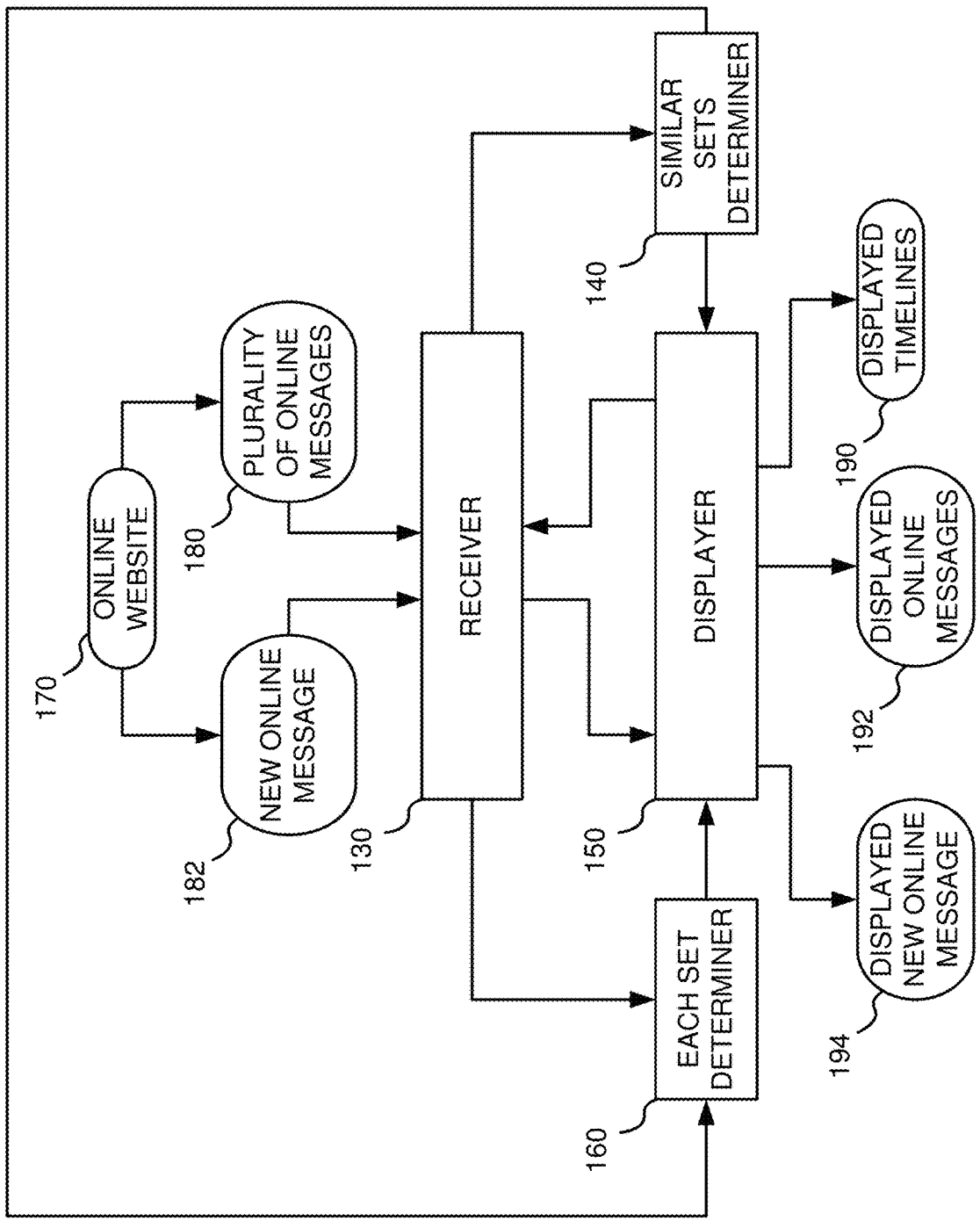
FIG. 1C depicts a block diagram in accordance with an exemplary embodiment of the present invention.

Referring to FIG. 1C, in an exemplary embodiment, the present invention includes a receiver 130, a similar sets determiner 140, a displayer 150, and an each set determiner 160. In an embodiment, receiver 130 is configured to receive a plurality of online messages 180 from an online website 170. In an embodiment, receiver 130 includes a computer system, such as computer system 700 as shown in FIG. 7, performing operation 110. In an embodiment, receiver 130 includes a computer system, such as computer system/server 712 as shown in FIG. 7, performing operation 110. In an embodiment, receiver 130 includes a computer system, such as processing unit 716 as shown in FIG. 7, performing operation 110. In an embodiment, receiver 130 is implemented as computer software executing on a computer system, such as computer system 700 as shown in FIG. 7, such that the computer system performs operation 110. In an embodiment, receiver 130 is implemented as computer software executing on a computer system, such as computer system/server 712 as shown in FIG. 7, such that the computer system performs operation 110. In an embodiment, receiver 130 is implemented as computer software executing on a computer system, such as processing unit 716 as shown in FIG. 7 such that the computer system performs operation 110. In an embodiment, receiver 130 performs operation 110 as computer software executing on a processor of receiver 130.

In an embodiment, similar sets determiner 140 is configured to execute a set of logical operations determining sets of similar online messages among plurality of online messages 180. In an embodiment, similar sets determiner 140 includes a computer system, such as computer system 700 as shown in FIG. 7, performing operation 112. In an embodiment, similar sets determiner 140 includes a computer system, such as computer system/server 712 as shown in FIG. 7, performing operation 112. In an embodiment, similar sets determiner 140 includes a computer system, such as processing unit 716 as shown in FIG. 7, performing operation 112. In an embodiment, similar sets determiner 140 is implemented as computer software executing on a computer system, such as computer system 700 as shown in FIG. 7, such that the computer system performs operation 112. In an embodiment, similar sets determiner 140 is implemented as computer software executing on a computer system, such as computer system/server 712 as shown in FIG. 7, such that the computer system performs operation 112. In an embodiment, similar sets determiner 140 is implemented as computer software executing on a computer system, such as processing unit 716 as shown in FIG. 7 such that the computer system performs operation 112. In an embodiment, similar sets determiner 140 performs operation 112 as computer software executing on a processor of determiner 140.

In an embodiment, displayer 150 is configured to display on a computer display each of the sets of similar online messages along a graphical representation of a timeline corresponding to the each of the sets of similar online messages, resulting in displayed timelines 190 and displayed online messages 192. In an embodiment, displayer 150 includes a computer system, such as computer system 700 as shown in FIG. 7, performing operation 114. In an embodiment, displayer 150 includes a computer system, such as computer system/server 712 as shown in FIG. 7, performing operation 114. In an embodiment, displayer 150 includes a computer system, such as processing unit 716 as shown in FIG. 7, performing operation 114. In an embodiment, displayer 150 is implemented as computer software executing on a computer system, such as computer system 700 as shown in FIG. 7, such that the computer system performs operation 114. In an embodiment, displayer 150 is implemented as computer software executing on a computer system, such as computer system/server 712 as shown in FIG. 7, such that the computer system performs operation 114. In an embodiment, displayer 150 is implemented as computer software executing on a computer system, such as processing unit 716 as shown in FIG. 7 such that the computer system performs operation 114. In an embodiment, displayer 150 performs operation 114 as computer software executing on a processor of displayer 150.

In an embodiment, each set determiner 160 is configured to execute, in response to receiving by receiver 130 a new online message 182 from online website 170, a set of logical operations determining each set among the sets of similar online messages to which new online message 182 is similar. In an embodiment, each set determiner 160 includes a computer system, such as computer system 700 as shown in FIG. 7, performing operation 120. In an embodiment, each set determiner 160 includes a computer system, such as computer system/server 712 as shown in FIG. 7, performing operation 120. In an embodiment, each set determiner 160 includes a computer system, such as processing unit 716 as shown in FIG. 7, performing operation 120. In an embodiment, each set determiner 160 is implemented as computer software executing on a computer system, such as computer system 700 as shown in FIG. 7, such that the computer system performs operation 120. In an embodiment, each set determiner 160 is implemented as computer software executing on a computer system, such as computer system/server 712 as shown in FIG. 7, such that the computer system performs operation 120. In an embodiment, each set determiner 160 is implemented as computer software executing on a computer system, such as processing unit 716 as shown in FIG. 7 such that the computer system performs operation 120. In an embodiment, each set determiner 160 performs operation 120 as computer software executing on a processor of each set determiner 160.

In an embodiment, displayer 150 is configured to display, in response to determining by each set determiner 160 the each set among the sets of similar online messages to which new online message 182 is similar, on the computer display new online message 182, resulting in a displayed new online message 194. In an embodiment, displayer 150 includes a computer system, such as computer system 700 as shown in FIG. 7, performing operation 122. In an embodiment, displayer 150 includes a computer system, such as computer system/server 712 as shown in FIG. 7, performing operation 122. In an embodiment, displayer 150 includes a computer system, such as processing unit 716 as shown in FIG. 7, performing operation 122. In an embodiment, displayer 150 is implemented as computer software executing on a computer system, such as computer system 700 as shown in FIG. 7, such that the computer system performs operation 122. In an embodiment, displayer 150 is implemented as computer software executing on a computer system, such as computer system/server 712 as shown in FIG. 7, such that the computer system performs operation 122. In an embodiment, displayer 150 is implemented as computer software executing on a computer system, such as processing unit 716 as shown in FIG. 7 such that the computer system performs operation 122. In an embodiment, displayer 150 performs operation 122 as computer software executing on a processor of displayer 150.

Determining Sets of Online Messages

In an exemplary embodiment, the executing the set of logical operations determining the sets of similar online messages includes clustering similar online messages among the plurality of online messages into the sets of similar online messages. In an embodiment, executing operation 112 includes clustering similar online messages among the plurality of online messages into the sets of similar online messages. In an embodiment, similar sets determiner 140 is configured to cluster similar online messages among plurality of online messages 180 into the sets of similar online messages. In an embodiment, similar sets determiner 140 includes a computer system, such as computer system 700 as shown in FIG. 7, clustering similar online messages among plurality of online messages 180 into the sets of similar online messages. In an embodiment, similar sets determiner 140 includes a computer system, such as computer system/server 712 as shown in FIG. 7, clustering similar online messages among plurality of online messages 180 into the sets of similar online messages. In an embodiment, similar sets determiner 140 includes a computer system, such as processing unit 716 as shown in FIG. 7, clustering similar online messages among plurality of online messages 180 into the sets of similar online messages. In an embodiment, similar sets determiner 140 is implemented as computer software executing on a computer system, such as computer system 700 as shown in FIG. 7, such that the computer system clusters similar online messages among plurality of online messages 180 into the sets of similar online messages. In an embodiment, similar sets determiner 140 is implemented as computer software executing on a computer system, such as computer system/server 712 as shown in FIG. 7, such that the computer system clusters similar online messages among plurality of online messages 180 into the sets of similar online messages. In an embodiment, similar sets determiner 140 is implemented as computer software executing on a computer system, such as processing unit 716 as shown in FIG. 7, such that the computer system clusters similar online messages among plurality of online messages 180 into the sets of similar online messages. In an embodiment, similar sets determiner 140 clusters similar online messages among plurality of online messages 180 into the sets of similar online messages as computer software executing on a processor of similar sets determiner 140.

In an embodiment, the present invention analyzes the posts/online messages and creates tree structures to organize the posts. For example, the present invention could identify a channel to be analyzed in the chatting system. Also, for example, the present invention could identify the post to be analyzed on the timeline, with a time constraint (e.g., back to the post of "n" days beforehand) and with a number of posts (a total of "m" posts). In a further example, the present invention could specify the maximum value of the number of clusters necessary for user interface display. In a specific example, if it is intended that 10 lanes are to be displayed by the present invention on a wide screen while only three lanes are to be displayed by the present invention on a narrow screen such as that of a mobile terminal, then the maximum number of clusters would be 10. In an embodiment, the present invention clusters the posts such that the present invention extracts feature amounts for the individual clusters and calculates the degrees of similarity of the individual clusters and groups the clusters in order of the degree of similarity. Also, for example, the present invention could determine from the obtained cluster information the specific cluster (or clusters) to which the respective posts pertain, and could create a tree structure whose branches in a chronologically manner are the posts pertaining to the same cluster.

In an embodiment, the present invention morphologically analyzes the posts such that the present invention extracts elements whose semantic meanings can be readily taken into account such as nouns, verbs, adjectives, symbols, and reshapes the extracted elements into their normalized forms by a dictionary. Also, for example, the present invention defines the entirety of the words taken from the posts to be morphologically analyzed as being the search space such that if the kinds of all of these words are given as "m", then the present invention could consider the maximum m-dimensional full search vector space and could define the respective document vectors. In a specific example, the present invention could perform processing such as inclusion of synonyms and meanings, and the present invention, by the nature of timelines where posts within short time period are often related to the same topic, could use the time at which the post was posted as an input to introduce it into the calculation of the distance between the vectors. In an embodiment, the present invention repeats these steps until the situation falls below the criterion for determining the convergence (e.g., avoiding local minimum and phenomena of failure to realize convergence due to oscillation or the like). In a specific example, the present invention could randomly define the cluster center points for the predefined number of clusters.

In an embodiment, the present invention calculates the distance to each document vector (to be defined as the evaluation function) and then could calculate and identify the clusters to which the respective documents pertain. In a specific example, the present invention could, when it is presupposed that one document should pertain to one cluster, regard each document as pertaining to the nearest center point that is the nearest when viewed from each document vector. In a specific example, the present invention could, when one document is allowed to pertain to multiple clusters, regard each document as pertaining to all the clusters having shorter distances than a predefined distance or to the nearest cluster. In another example, the present invention could make selection taking into account only the relative difference of the distance to the respective center points. In an embodiment, the present invention randomly moves the cluster center point. For example, if the present invention determines that the sum of the distances becomes smaller than in the calculating step, the present invention could move the cluster center point. In another example, the present invention regards the convergence as being established when the evaluations of all the cluster center points do not become lower anymore after predefined rounds of re-calculation. In a further example, the present invention extracts frequently used words from among the documents pertaining to the cluster after the convergence, such that the extracted words could be used by the present invention as the words that characterize the clusters to name the clusters.

Displaying Sets of Similar Online Messages

Figure 2A:
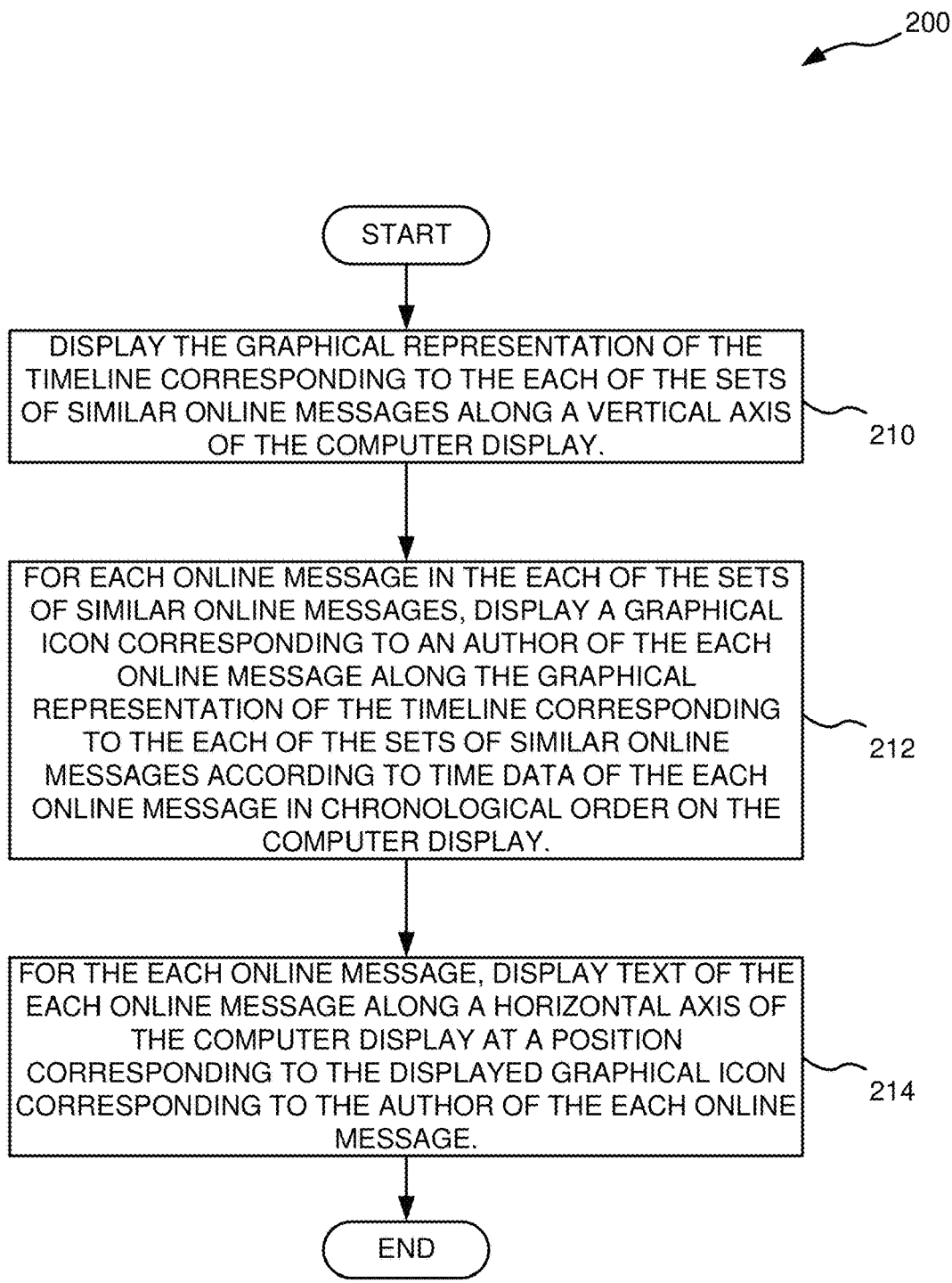
FIG. 2A depicts a flowchart in accordance with an embodiment of the present invention.

In an exemplary embodiment, the displaying on the computer display the each of the sets of similar online messages includes (a) displaying the graphical representation of the timeline corresponding to the each of the sets of similar online messages along a vertical axis of the computer display, (b) for each online message in the each of the sets of similar online messages, displaying a graphical icon corresponding to an author of the each online message along the graphical representation of the timeline corresponding to the each of the sets of similar online messages according to time data of the each online message in chronological order on the computer display, and (c) for the each online message, displaying text of the each online message along a horizontal axis of the computer display at a position corresponding to the displayed graphical icon corresponding to the author of the each online message. Referring to FIG. 2A, in an exemplary embodiment, displaying operation 114 includes an operation 210 of displaying the graphical representation of the timeline corresponding to the each of the sets of similar online messages along a vertical axis of the computer display, an operation 212 of for each online message in the each of the sets of similar online messages, displaying a graphical icon corresponding to an author of the each online message along the graphical representation of the timeline corresponding to the each of the sets of similar online messages according to time data of the each online message in chronological order on the computer display, and an operation 214 of for the each online message, displaying text of the each online message along a horizontal axis of the computer display at a position corresponding to the displayed graphical icon corresponding to the author of the each online message.

In an embodiment, displayer 150 includes a computer system 700 as shown in FIG. 7, that executes a managing and displaying online messages along timelines script or computer software application that carries out the operations of at least method 200. In an embodiment, displayer 150 includes a computer system/server 712 as shown in FIG. 7, that executes a managing and displaying online messages along timelines script or computer software application that carries out the operations of at least method 200. In an embodiment, displayer 150 includes a processing unit 716 as shown in FIG. 7, that executes a managing and displaying online messages along timelines script or computer software application that carries out the operations of at least method 200. In an embodiment, displayer 150 includes a computer system 700 as shown in FIG. 7, that executes a managing and displaying online messages along timelines script or computer software application that carries out at least operations 210, 212, and 214. In an embodiment, displayer 150 includes a computer system/server 712 as shown in FIG. 7, that executes a managing and displaying online messages along timelines script or computer software application that carries out at least operations 210, 212, and 214. In an embodiment, displayer 150 includes a processing unit 716 as shown in FIG. 7, that executes a managing and displaying online messages along timelines script or computer software application that carries out at least operations 210, 212, and 214.

In an embodiment, displayer 150 is configured to display the graphical representation of the timeline corresponding to the each of the sets of similar online messages along a vertical axis of the computer display. In an embodiment, displayer 150 includes a computer system, such as computer system 700 as shown in FIG. 7, performing operation 210. In an embodiment, displayer 150 includes a computer system, such as computer system/server 712 as shown in FIG. 7, performing operation 210. In an embodiment, displayer 150 includes a computer system, such as processing unit 716 as shown in FIG. 7, performing operation 210. In an embodiment, displayer 150 is implemented as computer software executing on a computer system, such as computer system 700 as shown in FIG. 7, such that the computer system performs operation 210. In an embodiment, displayer 150 is implemented as computer software executing on a computer system, such as computer system/server 712 as shown in FIG. 7, such that the computer system performs operation 210. In an embodiment, displayer 150 is implemented as computer software executing on a computer system, such as processing unit 716 as shown in FIG. 7 such that the computer system performs operation 210. In an embodiment, displayer 150 displays the graphical representation of the timeline corresponding to the each of the sets of similar online messages along a vertical axis of the computer display as computer software executing on a processor of displayer 150.

In an embodiment, displayer 150 is configured to display, for each online message in the each of the sets of similar online messages, a graphical icon corresponding to an author of the each online message along the graphical representation of the timeline corresponding to the each of the sets of similar online messages according to time data of the each online message in chronological order on the computer display. In an embodiment, displayer 150 includes a computer system, such as computer system 700 as shown in FIG. 7, performing operation 212. In an embodiment, displayer 150 includes a computer system, such as computer system/server 712 as shown in FIG. 7, performing operation 212. In an embodiment, displayer 150 includes a computer system, such as processing unit 716 as shown in FIG. 7, performing operation 212. In an embodiment, displayer 150 is implemented as computer software executing on a computer system, such as computer system 700 as shown in FIG. 7, such that the computer system performs operation 212. In an embodiment, displayer 150 is implemented as computer software executing on a computer system, such as computer system/server 712 as shown in FIG. 7, such that the computer system performs operation 212. In an embodiment, displayer 150 is implemented as computer software executing on a computer system, such as processing unit 716 as shown in FIG. 7 such that the computer system performs operation 212. In an embodiment, displayer 150 displays, for each online message in the each of the sets of similar online messages, a graphical icon corresponding to an author of the each online message along the graphical representation of the timeline corresponding to the each of the sets of similar online messages according to time data of the each online message in chronological order on the computer display.

In an embodiment, displayer 150 is configured to display, for the each online message, text of the each online message along a horizontal axis of the computer display at a position corresponding to the displayed graphical icon corresponding to the author of the each online message. In an embodiment, displayer 150 includes a computer system, such as computer system 700 as shown in FIG. 7, performing operation 214. In an embodiment, displayer 150 includes a computer system, such as computer system/server 712 as shown in FIG. 7, performing operation 214. In an embodiment, displayer 150 includes a computer system, such as processing unit 716 as shown in FIG. 7, performing operation 214. In an embodiment, displayer 150 is implemented as computer software executing on a computer system, such as computer system 700 as shown in FIG. 7, such that the computer system performs operation 214. In an embodiment, displayer 150 is implemented as computer software executing on a computer system, such as computer system/server 712 as shown in FIG. 7, such that the computer system performs operation 214. In an embodiment, displayer 150 is implemented as computer software executing on a computer system, such as processing unit 716 as shown in FIG. 7 such that the computer system performs operation 214. In an embodiment, displayer 150 displays, for the each online message, text of the each online message along a horizontal axis of the computer display at a position corresponding to the displayed graphical icon corresponding to the author of the each online message.

Visual Rendering

Figure 2B:
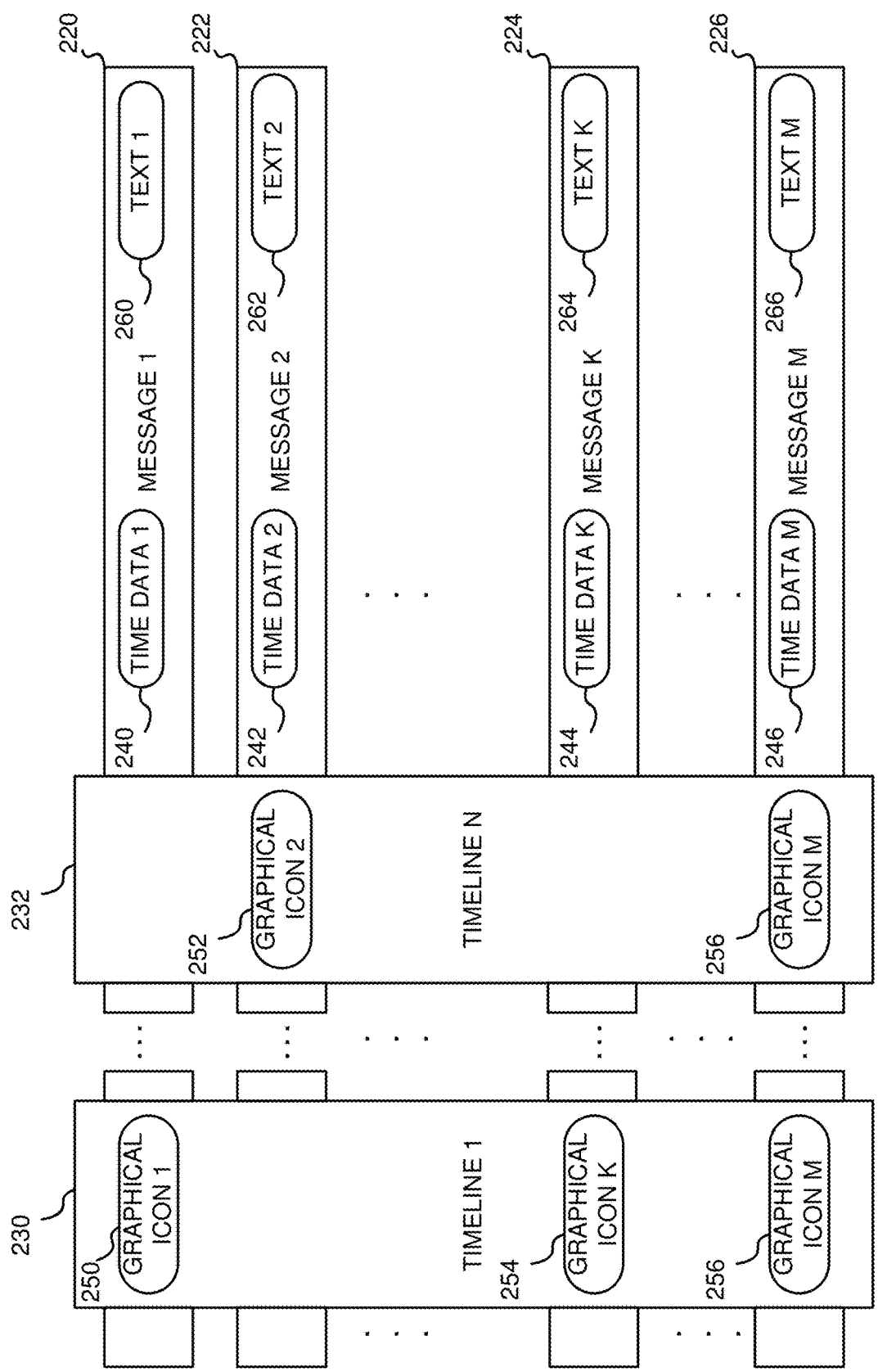
FIG. 2B depicts a graphical display in accordance with an embodiment of the present invention.

In an exemplary embodiment, the displaying on the computer display the each of the sets of similar online messages includes displaying sets of similar online messages along graphical representations of timelines corresponding to the sets of similar online messages. Referring to FIG. 2B, in an exemplary embodiment, displaying operation 114 includes displaying sets of similar online messages 220, 224, 226 (e.g., message 1, message K, message M), and 222, 226 (e.g., message 2, message M), along graphical representations 230, 232 (e.g., timeline 1, timeline N) of timelines corresponding to sets of similar online messages 220, 224, 226 (e.g., message 1, message K, message M), and 222, 226 (e.g., message 2, message M).

In an exemplary embodiment, the displaying on the computer display the each of the sets of similar online messages includes displaying graphical representations of the timelines corresponding to the sets of similar online messages along vertical axes of the computer display. Referring to FIG. 2B, in an exemplary embodiment, displaying operation 114 includes displaying graphical representations 230, 232 (e.g., timeline 1, timeline N) of the timelines corresponding to sets of similar online messages 220, 224, 226 (e.g., message 1, message K, message M), and 222, 226 (e.g., message 2, message M) along vertical axes of the computer display.

In an exemplary embodiment, the displaying on the computer display the each of the sets of similar online messages includes displaying graphical icons corresponding to authors of the online messages along the graphical representations of the timelines corresponding to the sets of similar online messages according to time data of the online messages in chronological order on the computer display. Referring to FIG. 2B, in an exemplary embodiment, displaying operation 114 includes displaying graphical icons 250, 254, 256 (e.g., graphical icon 1, graphical icon K, graphical icon M), and 252, 256 (e.g., graphical icon 2, graphical icon M) corresponding to the authors of online messages 220, 224, 226 (e.g., message 1, message K, message M), and 222, 226 (e.g., message 2, message M) along graphical representations 230, 232 (e.g., timeline 1, timeline N) of the timelines corresponding to sets of similar online messages 220, 224, 226 (e.g., message 1, message K, message M), and 222, 226 (e.g., message 2, message M) according to time data 240, 244, 246 (e.g., time data 1, time data K, time data M), and 242, 246 (e.g., time data 1 and time data M) of online messages 220, 224, 226 (e.g., message 1, message K, message M), and 222, 226 (e.g., message 2, message M) in chronological order on the computer display.

In an exemplary embodiment, the displaying on the computer display the each of the sets of similar online messages includes displaying text of the online messages along horizontal axes of the computer display at positions corresponding to the displayed graphical icons corresponding to the authors of the online messages. Referring to FIG. 2B, in an exemplary embodiment, displaying operation 114 includes displaying text 260, 264, 266 (e.g., text 1, text K, text M), and 262, 266 (e.g., text 2, text M) of online messages 220, 224, 226 (e.g., message 1, message K, message M), and 222, 226 (e.g., message 2, message M) along horizontal axes of the computer display at positions corresponding to the displayed 250, 254, 256 (e.g., graphical icon 1, graphical icon K, graphical icon M), and 252, 256 (e.g., graphical icon 2, graphical icon M) corresponding to the authors of online messages 220, 224, 226 (e.g., message 1, message K, message M), and 222, 226 (e.g., message 2, message M).

Managing Sets of Similar Online Messages Similar to New Online Message

Figure 3A:
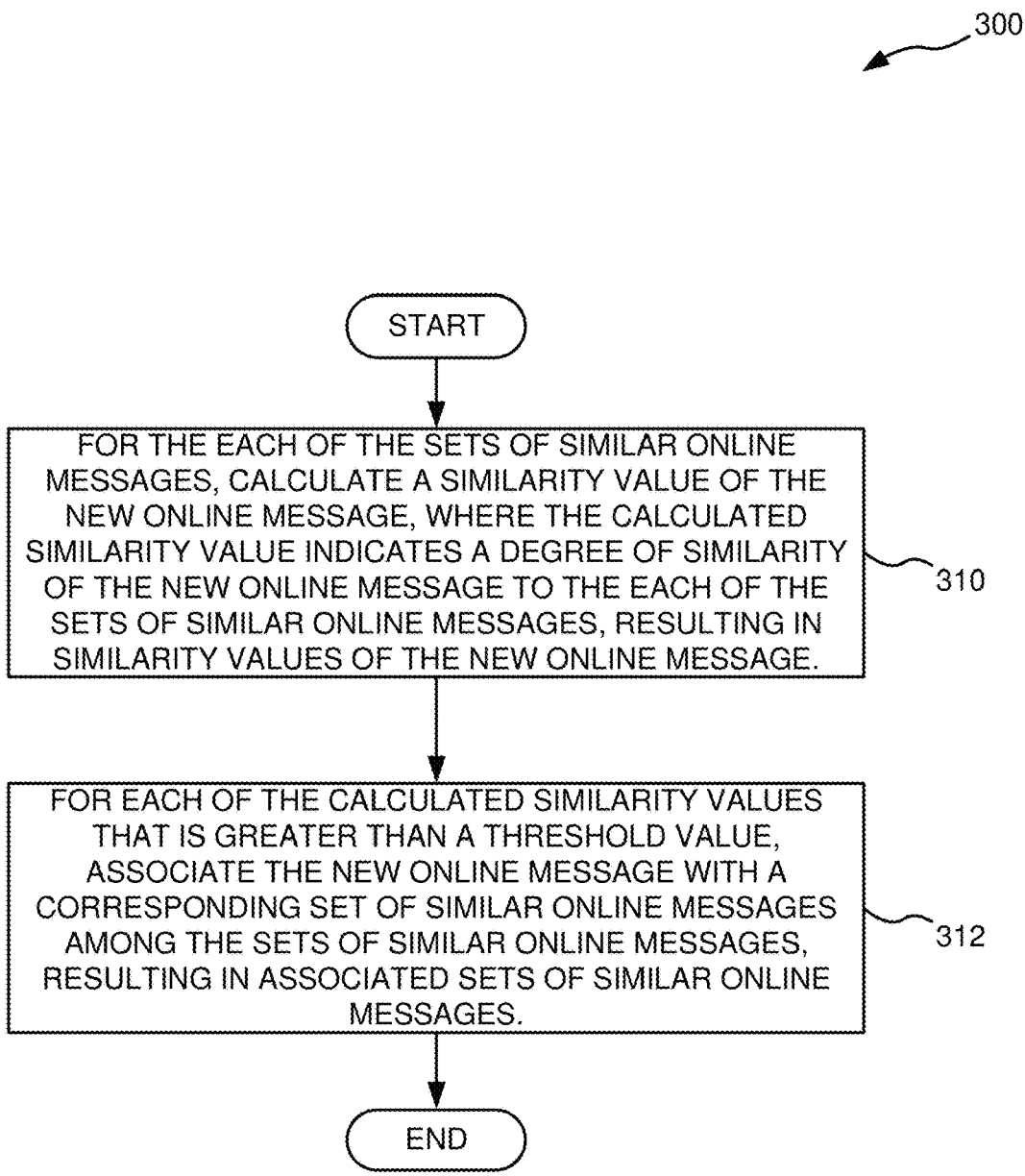
FIG. 3A depicts a flowchart in accordance with an embodiment of the present invention.

In an exemplary embodiment, the executing the set of logical operations determining the each set among the sets of similar online messages to which the new online message is similar includes (a) for the each of the sets of similar online messages, calculating a similarity value of the new online message, where the calculated similarity value indicates a degree of similarity of the new online message to the each of the sets of similar online messages, resulting in similarity values of the new online message and (b) for each of the calculated similarity values that is greater than a threshold value, associating the new online message with a corresponding set of similar online messages among the sets of similar online messages, resulting in associated sets of similar online messages. Referring to FIG. 3A, in an exemplary embodiment, executing operation 120 includes an operation 310 of for the each of the sets of similar online messages, calculating a similarity value of the new online message, where the calculated similarity value indicates a degree of similarity of the new online message to the each of the sets of similar online messages, resulting in similarity values of the new online message and an operation 312 of for each of the calculated similarity values that is greater than a threshold value, associating the new online message with a corresponding set of similar online messages among the sets of similar online messages, resulting in associated sets of similar online messages.

In an embodiment, each set determiner 160 includes a computer system 700 as shown in FIG. 7, that executes a managing and displaying online messages along timelines script or computer software application that carries out the operations of at least method 300. In an embodiment, each set determiner 160 includes a computer system/server 712 as shown in FIG. 7, that executes a managing and displaying online messages along timelines script or computer software application that carries out the operations of at least method 300. In an embodiment, each set determiner 160 includes a processing unit 716 as shown in FIG. 7, that executes a managing and displaying online messages along timelines script or computer software application that carries out the operations of at least method 300. In an embodiment, each set determiner 160 includes a computer system 700 as shown in FIG. 7, that executes a managing and displaying online messages along timelines script or computer software application that carries out at least operations 310 and 312. In an embodiment, each set determiner 160 includes a computer system/server 712 as shown in FIG. 7, that executes a managing and displaying online messages along timelines script or computer software application that carries out at least operations 310 and 312. In an embodiment, each set determiner 160 includes a processing unit 716 as shown in FIG. 7, that executes a managing and displaying online messages along timelines script or computer software application that carries out at least operations 310 and 312.

In an embodiment, each set determiner 160 is configured to calculate, for the each of the sets of similar online messages, a similarity value of the new online message, where the calculated similarity value indicates a degree of similarity of the new online message to the each of the sets of similar online messages, resulting in similarity values of the new online message. In an embodiment, each set determiner 160 includes a computer system, such as computer system 700 as shown in FIG. 7, performing operation 310. In an embodiment, each set determiner 160 includes a computer system, such as computer system/server 712 as shown in FIG. 7, performing operation 310. In an embodiment, each set determiner 160 includes a computer system, such as processing unit 716 as shown in FIG. 7, performing operation 310. In an embodiment, each set determiner 160 is implemented as computer software executing on a computer system, such as computer system 700 as shown in FIG. 7, such that the computer system performs operation 310. In an embodiment, each set determiner 160 is implemented as computer software executing on a computer system, such as computer system/server 712 as shown in FIG. 7, such that the computer system performs operation 310. In an embodiment, each set determiner 160 is implemented as computer software executing on a computer system, such as processing unit 716 as shown in FIG. 7 such that the computer system performs operation 310. In an embodiment, each set determiner 160 calculates, for the each of the sets of similar online messages, a similarity value of the new online message, where the calculated similarity value indicates a degree of similarity of the new online message to the each of the sets of similar online messages, resulting in similarity values of the new online message as computer software executing on a processor of each set determiner 160.

In an embodiment, each set determiner 160 is configured to associate, for each of the calculated similarity values that is greater than a threshold value, the new online message with a corresponding set of similar online messages among the sets of similar online messages, resulting in associated sets of similar online messages. In an embodiment, each set determiner 160 includes a computer system, such as computer system 700 as shown in FIG. 7, performing operation 312. In an embodiment, each set determiner 160 includes a computer system, such as computer system/server 712 as shown in FIG. 7, performing operation 312. In an embodiment, each set determiner 160 includes a computer system, such as processing unit 716 as shown in FIG. 7, performing operation 312. In an embodiment, each set determiner 160 is implemented as computer software executing on a computer system, such as computer system 700 as shown in FIG. 7, such that the computer system performs operation 312. In an embodiment, each set determiner 160 is implemented as computer software executing on a computer system, such as computer system/server 712 as shown in FIG. 7, such that the computer system performs operation 312. In an embodiment, each set determiner 160 is implemented as computer software executing on a computer system, such as processing unit 716 as shown in FIG. 7 such that the computer system performs operation 312. In an embodiment, each set determiner 160 associates, for each of the calculated similarity values that is greater than a threshold value, the new online message with a corresponding set of similar online messages among the sets of similar online messages, resulting in associated sets of similar online messages as computer software executing on a processor of each set determiner 160.

Displaying New Online Message for Associated Sets of Similar Online Messages

Figure 3B:
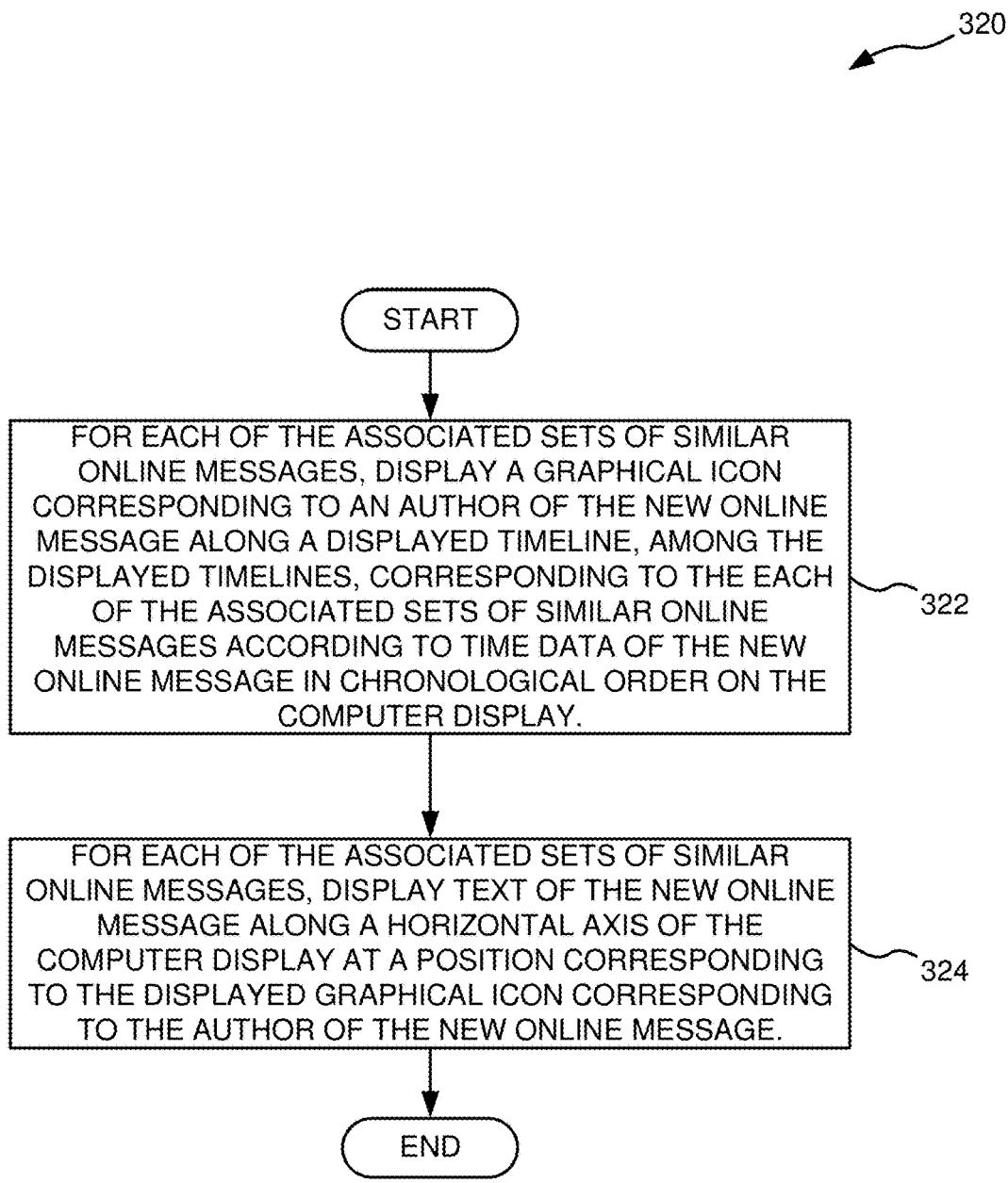
FIG. 3B depicts a flowchart in accordance with an embodiment of the present invention.

In an exemplary embodiment, the displaying on the computer display the new online message includes (a) for each of the associated sets of similar online messages, displaying a graphical icon corresponding to an author of the new online message along a displayed timeline, among the displayed timelines, corresponding to the each of the associated sets of similar online messages according to time data of the new online message in chronological order on the computer display and (b) for each of the associated sets of similar online messages, displaying text of the new online message along a horizontal axis of the computer display at a position corresponding to the displayed graphical icon corresponding to the author of the new online message. Referring to FIG. 3B, in an exemplary embodiment, displaying operation 122 includes an operation 322 of for each of the associated sets of similar online messages, displaying a graphical icon corresponding to an author of the new online message along a displayed timeline, among the displayed timelines, corresponding to the each of the associated sets of similar online messages according to time data of the new online message in chronological order on the computer display and an operation 324 of for each of the associated sets of similar online messages, displaying text of the new online message along a horizontal axis of the computer display at a position corresponding to the displayed graphical icon corresponding to the author of the new online message.

In an embodiment, displayer 150 includes a computer system 700 as shown in FIG. 7, that executes a managing and displaying online messages along timelines script or computer software application that carries out the operations of at least method 320. In an embodiment, displayer 150 includes a computer system/server 712 as shown in FIG. 7, that executes a managing and displaying online messages along timelines script or computer software application that carries out the operations of at least method 320. In an embodiment, displayer 150 includes a processing unit 716 as shown in FIG. 7, that executes a managing and displaying online messages along timelines script or computer software application that carries out the operations of at least method 320. In an embodiment, displayer 150 includes a computer system 700 as shown in FIG. 7, that executes a managing and displaying online messages along timelines script or computer software application that carries out at least operations 322 and 324. In an embodiment, displayer 150 includes a computer system/server 712 as shown in FIG. 7, that executes a managing and displaying online messages along timelines script or computer software application that carries out at least operations 322 and 324. In an embodiment, displayer 150 includes a processing unit 716 as shown in FIG. 7, that executes a managing and displaying online messages along timelines script or computer software application that carries out at least operations 322 and 324.

In an embodiment, displayer 150 is configured to display, for each of the associated sets of similar online messages, a graphical icon corresponding to an author of the new online message along a displayed timeline, among the displayed timelines, corresponding to the each of the associated sets of similar online messages according to time data of the new online message in chronological order on the computer display. In an embodiment, displayer 150 includes a computer system, such as computer system 700 as shown in FIG. 7, performing operation 322. In an embodiment, displayer 150 includes a computer system, such as computer system/ server 712 as shown in FIG. 7, performing operation 322. In an embodiment, displayer 150 includes a computer system, such as processing unit 716 as shown in FIG. 7, performing operation 322. In an embodiment, displayer 150 is implemented as computer software executing on a computer system, such as computer system 700 as shown in FIG. 7, such that the computer system performs operation 322. In an embodiment, displayer 150 is implemented as computer software executing on a computer system, such as computer system/server 712 as shown in FIG. 7, such that the computer system performs operation 322. In an embodiment, displayer 150 is implemented as computer software executing on a computer system, such as processing unit 716 as shown in FIG. 7 such that the computer system performs operation 322. In an embodiment, displayer 150 displays, for each of the associated sets of similar online messages, a graphical icon corresponding to an author of the new online message along a displayed timeline, among the displayed timelines, corresponding to the each of the associated sets of similar online messages according to time data of the new online message in chronological order on the computer display as computer software executing on a processor of displayer 150.

In an embodiment, displayer 150 is configured to display, for each of the associated sets of similar online messages, text of the new online message along a horizontal axis of the computer display at a position corresponding to the displayed graphical icon corresponding to the author of the new online message. In an embodiment, displayer 150 includes a computer system, such as computer system 700 as shown in FIG. 7, performing operation 324. In an embodiment, displayer 150 includes a computer system, such as computer system/server 712 as shown in FIG. 7, performing operation 324. In an embodiment, displayer 150 includes a computer system, such as processing unit 716 as shown in FIG. 7, performing operation 324. In an embodiment, displayer 150 is implemented as computer software executing on a computer system, such as computer system 700 as shown in FIG. 7, such that the computer system performs operation 324. In an embodiment, displayer 150 is implemented as computer software executing on a computer system, such as computer system/server 712 as shown in FIG. 7, such that the computer system performs operation 324. In an embodiment, displayer 150 is implemented as computer software executing on a computer system, such as processing unit 716 as shown in FIG. 7 such that the computer system performs operation 324. In an embodiment, displayer 150 displays, for each of the associated sets of similar online messages, text of the new online message along a horizontal axis of the computer display at a position corresponding to the displayed graphical icon corresponding to the author of the new online message as computer software executing on a processor of displayer 150.

Displaying New Online Message Dissimilar to Sets of Similar Online Messages

In an exemplary embodiment, the displaying on the computer display the new online message includes for each of the calculated similarity values that is less than or equal to the threshold value, displaying on the computer display the new online message along a graphical representation of a timeline according to time data of the new online message in chronological order. In an embodiment, displaying operation 122 includes for each of the calculated similarity values that is less than or equal to the threshold value, displaying on the computer display the new online message along a graphical representation of a timeline according to time data of the new online message in chronological order.

In an embodiment, displayer 150 is configured to display, for each of the calculated similarity values that is less than or equal to the threshold value, on the computer display the new online message along a graphical representation of a timeline according to time data of the new online message in chronological order. In an embodiment, displayer 150 includes a computer system, such as computer system 700 as shown in FIG. 7, displaying, for each of the calculated similarity values that is less than or equal to the threshold value, on the computer display the new online message along a graphical representation of a timeline according to time data of the new online message in chronological order. In an embodiment, displayer 150 includes a computer system, such as computer system/server 712 as shown in FIG. 7, displaying, for each of the calculated similarity values that is less than or equal to the threshold value, on the computer display the new online message along a graphical representation of a timeline according to time data of the new online message in chronological order. In an embodiment, displayer 150 includes a computer system, such as processing unit 716 as shown in FIG. 7, displaying, for each of the calculated similarity values that is less than or equal to the threshold value, on the computer display the new online message along a graphical representation of a timeline according to time data of the new online message in chronological order.

In an embodiment, displayer 150 is implemented as computer software executing on a computer system, such as computer system 700 as shown in FIG. 7, such that the computer system displays, for each of the calculated similarity values that is less than or equal to the threshold value, on the computer display the new online message along a graphical representation of a timeline according to time data of the new online message in chronological order. In an embodiment, displayer 150 is implemented as computer software executing on a computer system, such as computer system/server 712 as shown in FIG. 7, such that the computer system displays, for each of the calculated similarity values that is less than or equal to the threshold value, on the computer display the new online message along a graphical representation of a timeline according to time data of the new online message in chronological order. In an embodiment, displayer 150 is implemented as computer software executing on a computer system, such as processing unit 716 as shown in FIG. 7, such that the computer system displays, for each of the calculated similarity values that is less than or equal to the threshold value, on the computer display the new online message along a graphical representation of a timeline according to time data of the new online message in chronological order. In an embodiment, displayer 150 displays, for each of the calculated similarity values that is less than or equal to the threshold value, on the computer display the new online message along a graphical representation of a timeline according to time data of the new online message in chronological order as computer software executing on a processor of displayer 150.

Width Constrained Displays of Timelines

In a further embodiment, the computer implemented method, the system, and the computer program product further include displaying, by the computer system, the displayed timelines on the computer display such that a combined width of the displayed timelines is less than or equal to a width of the computer display in response to the computer display displaying the displayed timelines. In a further embodiment, the present invention is further configured to display, by the computer system, the displayed timelines on the computer display such that a combined width of the displayed timelines is less than or equal to a width of the computer display in response to the computer display displaying the displayed timelines.

In an embodiment, displayer 150 is configured to display the displayed timelines on the computer display such that a combined width of the displayed timelines is less than or equal to a width of the computer display in response to the computer display displaying the displayed timelines. In an embodiment, displayer 150 includes a computer system, such as computer system 700 as shown in FIG. 7, displaying the displayed timelines on the computer display such that a combined width of the displayed timelines is less than or equal to a width of the computer display in response to the computer display displaying the displayed timelines. In an embodiment, displayer 150 includes a computer system, such as computer system/server 712 as shown in FIG. 7, displaying the displayed timelines on the computer display such that a combined width of the displayed timelines is less than or equal to a width of the computer display in response to the computer display displaying the displayed timelines. In an embodiment, displayer 150 includes a computer system, such as processing unit 716 as shown in FIG. 7, displaying the displayed timelines on the computer display such that a combined width of the displayed timelines is less than or equal to a width of the computer display in response to the computer display displaying the displayed timelines. In an embodiment, displayer 150 is implemented as computer software executing on a computer system, such as computer system 700 as shown in FIG. 7, such that the computer system displays the displayed timelines on the computer display such that a combined width of the displayed timelines is less than or equal to a width of the computer display in response to the computer display displaying the displayed timelines. In an embodiment, displayer 150 is implemented as computer software executing on a computer system, such as computer system/server 712 as shown in FIG. 7, such that the computer system displays the displayed timelines on the computer display such that a combined width of the displayed timelines is less than or equal to a width of the computer display in response to the computer display displaying the displayed timelines. In an embodiment, displayer 150 is implemented as computer software executing on a computer system, such as processing unit 716 as shown in FIG. 7, such that the computer system displays the displayed timelines on the computer display such that a combined width of the displayed timelines is less than or equal to a width of the computer display in response to the computer display displaying the displayed timelines. In an embodiment, displayer 150 displays the displayed timelines on the computer display such that a combined width of the displayed timelines is less than or equal to a width of the computer display in response to the computer display displaying the displayed timelines as computer software executing on a processor of displayer 150.

Displaying Pairs of Displayed Timelines

Figure 4A:
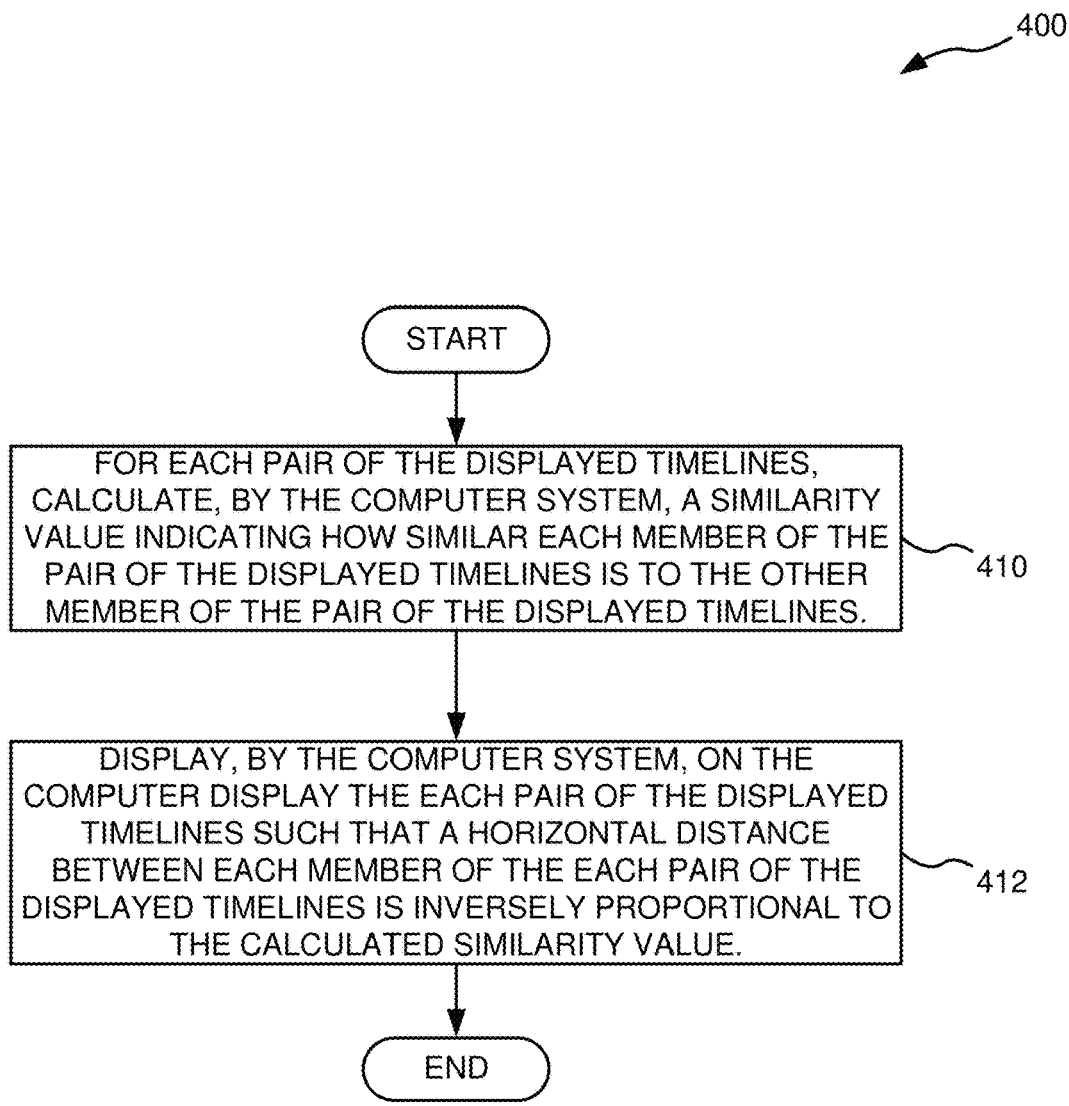
FIG. 4A depicts a flowchart in accordance with an embodiment of the present invention.

In an exemplary embodiment, the displaying the displayed timelines includes (a) for each pair of the displayed timelines, calculating, by the computer system, a similarity value indicating how similar each member of the pair of the displayed timelines is to the other member of the pair of the displayed timelines and (b) displaying, by the computer system, on the computer display the each pair of the displayed timelines such that a horizontal distance between each member of the each pair of the displayed timelines is inversely proportional to the calculated similarity value. Referring to FIG. 4A, in an exemplary embodiment, displaying the displayed timelines includes an operation 410 of for each pair of the displayed timelines, calculating, by the computer system, a similarity value indicating how similar each member of the pair of the displayed timelines is to the other member of the pair of the displayed timelines and an operation 412 of displaying, by the computer system, on the computer display the each pair of the displayed timelines such that a horizontal distance between each member of the each pair of the displayed timelines is inversely proportional to the calculated similarity value.

In an embodiment, displayer 150 includes a computer system 700 as shown in FIG. 7, that executes a managing and displaying online messages along timelines script or computer software application that carries out the operations of at least method 400. In an embodiment, displayer 150 includes a computer system/server 712 as shown in FIG. 7, that executes a managing and displaying online messages along timelines script or computer software application that carries out the operations of at least method 400. In an embodiment, displayer 150 includes a processing unit 716 as shown in FIG. 7, that executes a managing and displaying online messages along timelines script or computer software application that carries out the operations of at least method 400. In an embodiment, displayer 150 includes a computer system 700 as shown in FIG. 7, that executes a managing and displaying online messages along timelines script or computer software application that carries out at least operations 410 and 412. In an embodiment, displayer 150 includes a computer system/server 712 as shown in FIG. 7, that executes a managing and displaying online messages along timelines script or computer software application that carries out at least operations 410 and 412. In an embodiment, displayer 150 includes a processing unit 716 as shown in FIG. 7, that executes a managing and displaying online messages along timelines script or computer software application that carries out at least operations 410 and 412.

In an embodiment, displayer 150 is configured to calculate, for each pair of the displayed timelines, a similarity value indicating how similar each member of the pair of the displayed timelines is to the other member of the pair of the displayed timelines. In an embodiment, displayer 150 includes a computer system, such as computer system 700 as shown in FIG. 7, performing operation 410. In an embodiment, displayer 150 includes a computer system, such as computer system/server 712 as shown in FIG. 7, performing operation 410. In an embodiment, displayer 150 includes a computer system, such as processing unit 716 as shown in FIG. 7, performing operation 410. In an embodiment, displayer 150 is implemented as computer software executing on a computer system, such as computer system 700 as shown in FIG. 7, such that the computer system performs operation 410. In an embodiment, displayer 150 is implemented as computer software executing on a computer system, such as computer system/server 712 as shown in FIG. 7, such that the computer system performs operation 410. In an embodiment, displayer 150 is implemented as computer software executing on a computer system, such as processing unit 716 as shown in FIG. 7 such that the computer system performs operation 410. In an embodiment, displayer 150 calculates, for each pair of the displayed timelines, a similarity value indicating how similar each member of the pair of the displayed timelines is to the other member of the pair of the displayed timelines as computer software executing on a processor of displayer 150.

In an embodiment, displayer 150 is configured to display on the computer display the each pair of the displayed timelines such that a horizontal distance between each member of the each pair of the displayed timelines is inversely proportional to the calculated similarity value. In an embodiment, displayer 150 includes a computer system, such as computer system 700 as shown in FIG. 7, performing operation 412. In an embodiment, displayer 150 includes a computer system, such as computer system/server 712 as shown in FIG. 7, performing operation 412. In an embodiment, displayer 150 includes a computer system, such as processing unit 716 as shown in FIG. 7, performing operation 412. In an embodiment, displayer 150 is implemented as computer software executing on a computer system, such as computer system 700 as shown in FIG. 7, such that the computer system performs operation 412. In an embodiment, displayer 150 is implemented as computer software executing on a computer system, such as computer system/server 712 as shown in FIG. 7, such that the computer system performs operation 412. In an embodiment, displayer 150 is implemented as computer software executing on a computer system, such as processing unit 716 as shown in FIG. 7 such that the computer system performs operation 412. In an embodiment, displayer 150 displays on the computer display the each pair of the displayed timelines such that a horizontal distance between each member of the each pair of the displayed timelines is inversely proportional to the calculated similarity value as computer software executing on a processor of displayer 150.

Integral Display

Figure 4B:
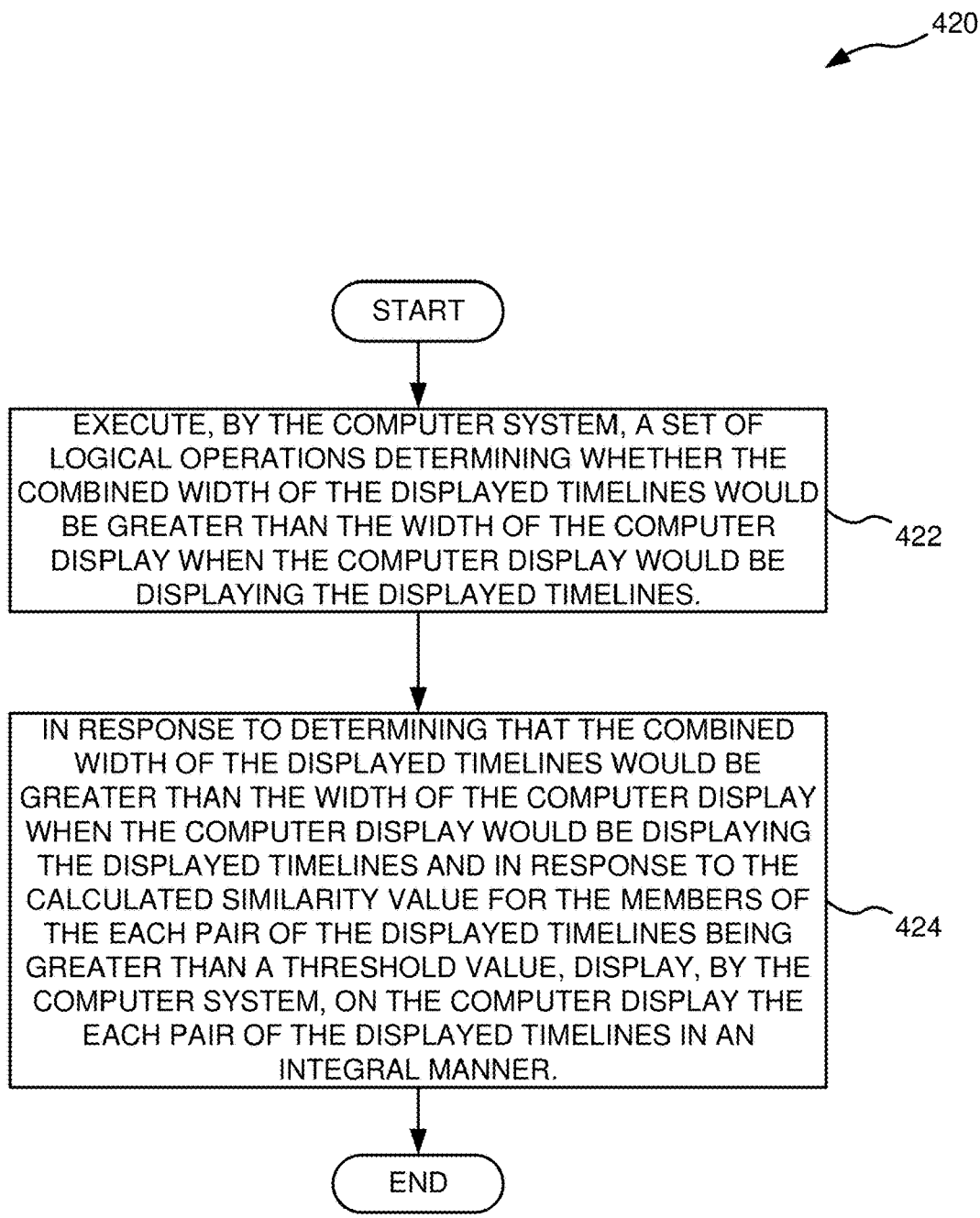
FIG. 4B depicts a flowchart in accordance with an embodiment of the present invention.

In an exemplary embodiment, the displaying the each pair of the displayed timelines includes (a) executing, by the computer system, a set of logical operations determining whether the combined width of the displayed timelines would be greater than the width of the computer display when the computer display would be displaying the displayed timelines and (b) in response to determining that the combined width of the displayed timelines would be greater than the width of the computer display when the computer display would be displaying the displayed timelines and in response to the calculated similarity value for the members of the each pair of the displayed timelines being greater than a threshold value, displaying, by the computer system, on the computer display the each pair of the displayed timelines in an integral manner. Referring to FIG. 4B, in an exemplary embodiment, displaying the each pair of the displayed timelines includes an operation 422 of executing, by the computer system, a set of logical operations determining whether the combined width of the displayed timelines would be greater than the width of the computer display when the computer display would be displaying the displayed timelines and an operation 422 of in response to determining that the combined width of the displayed timelines would be greater than the width of the computer display when the computer display would be displaying the displayed timelines and in response to the calculated similarity value for the members of the each pair of the displayed timelines being greater than a threshold value, displaying, by the computer system, on the computer display the each pair of the displayed timelines in an integral manner.

In an embodiment, displayer 150 includes a computer system 700 as shown in FIG. 7, that executes a managing and displaying online messages along timelines script or computer software application that carries out the operations of at least method 420. In an embodiment, displayer 150 includes a computer system/server 712 as shown in FIG. 7, that executes a managing and displaying online messages along timelines script or computer software application that carries out the operations of at least method 420. In an embodiment, displayer 150 includes a processing unit 716 as shown in FIG. 7, that executes a managing and displaying online messages along timelines script or computer software application that carries out the operations of at least method 420. In an embodiment, displayer 150 includes a computer system 700 as shown in FIG. 7, that executes a managing and displaying online messages along timelines script or computer software application that carries out at least operations 422 and 424. In an embodiment, displayer 150 includes a computer system/server 712 as shown in FIG. 7, that executes a managing and displaying online messages along timelines script or computer software application that carries out at least operations 422 and 424. In an embodiment, displayer 150 includes a processing unit 716 as shown in FIG. 7, that executes a managing and displaying online messages along timelines script or computer software application that carries out at least operations 422 and 424.

In an embodiment, displayer 150 is configured to execute a set of logical operations determining whether the combined width of the displayed timelines would be greater than the width of the computer display when the computer display would be displaying the displayed timelines. In an embodiment, displayer 150 includes a computer system, such as computer system 700 as shown in FIG. 7, performing operation 422. In an embodiment, displayer 150 includes a computer system, such as computer system/server 712 as shown in FIG. 7, performing operation 422. In an embodiment, displayer 150 includes a computer system, such as processing unit 716 as shown in FIG. 7, performing operation 422. In an embodiment, displayer 150 is implemented as computer software executing on a computer system, such as computer system 700 as shown in FIG. 7, such that the computer system performs operation 422. In an embodiment, displayer 150 is implemented as computer software executing on a computer system, such as computer system/server 712 as shown in FIG. 7, such that the computer system performs operation 422. In an embodiment, displayer 150 is implemented as computer software executing on a computer system, such as processing unit 716 as shown in FIG. 7 such that the computer system performs operation 422. In an embodiment, displayer 150 executes a set of logical operations determining whether the combined width of the displayed timelines would be greater than the width of the computer display when the computer display would be displaying the displayed timelines as computer software executing on a processor of displayer 150.

In an embodiment, displayer 150 is configured to display, in response to determining that the combined width of the displayed timelines would be greater than the width of the computer display when the computer display would be displaying the displayed timelines and in response to the calculated similarity value for the each pair of the displayed timelines being greater than a threshold value, on the computer display the each pair of the displayed timelines in an integral manner. In an embodiment, displayer 150 includes a computer system, such as computer system 700 as shown in FIG. 7, performing operation 424. In an embodiment, displayer 150 includes a computer system, such as computer system/server 712 as shown in FIG. 7, performing operation 424. In an embodiment, displayer 150 includes a computer system, such as processing unit 716 as shown in FIG. 7, performing operation 424. In an embodiment, displayer 150 is implemented as computer software executing on a computer system, such as computer system 700 as shown in FIG. 7, such that the computer system performs operation 424. In an embodiment, displayer 150 is implemented as computer software executing on a computer system, such as computer system/server 712 as shown in FIG. 7, such that the computer system performs operation 424. In an embodiment, displayer 150 is implemented as computer software executing on a computer system, such as processing unit 716 as shown in FIG. 7 such that the computer system performs operation 424. In an embodiment, displayer 150 displays, in response to determining that the combined width of the displayed timelines would be greater than the width of the computer display when the computer display would be displaying the displayed timelines and in response to the calculated similarity value for the members of the each pair of the displayed timelines being greater than a threshold value, on the computer display the each pair of the displayed timelines in an integral manner as computer software executing on a processor of displayer 150.

Interactive Display

Interactive Displayed Timelines

Figure 5A:
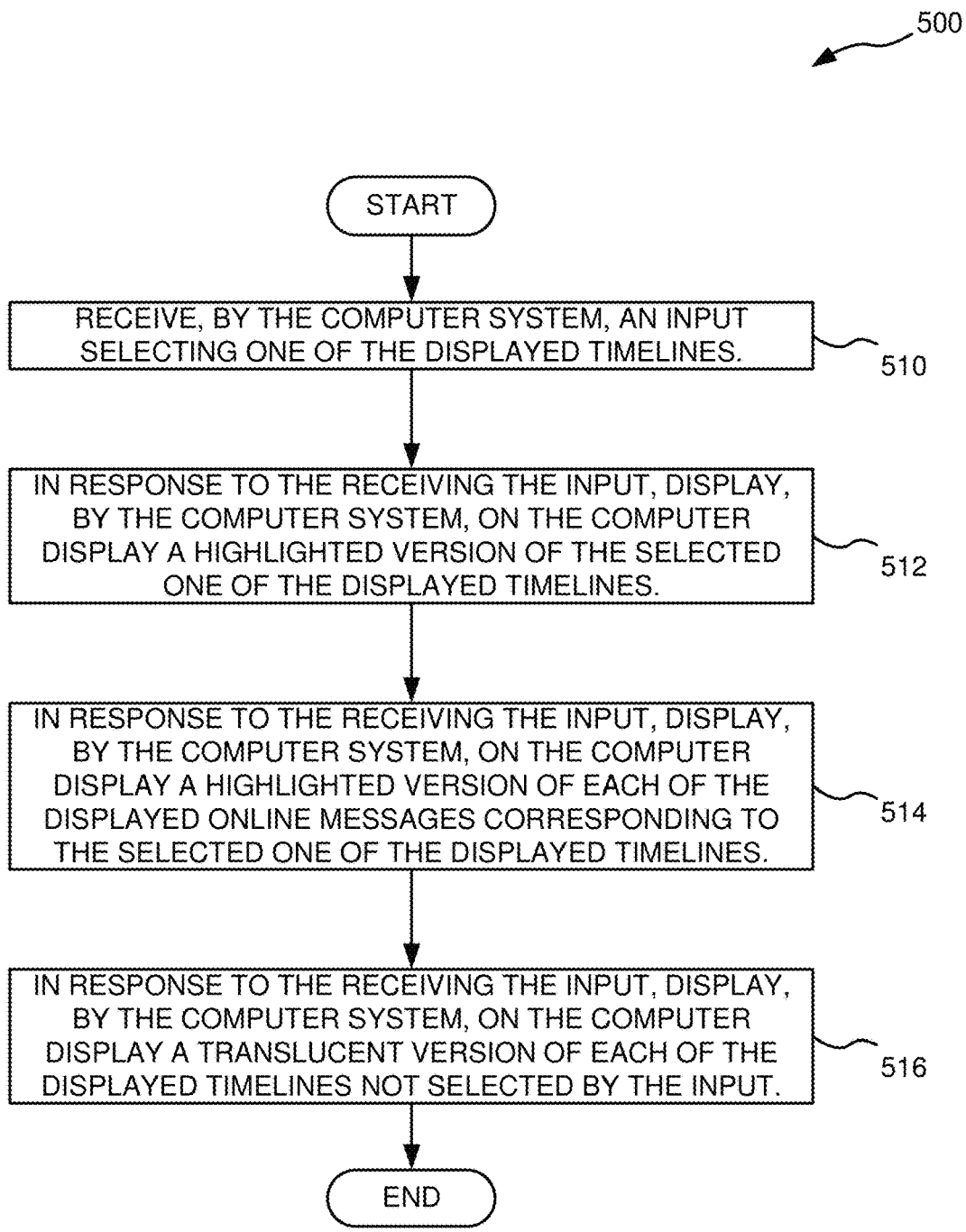
FIG. 5A depicts a flowchart in accordance with an embodiment of the present invention.

In a further embodiment, the computer implemented method, the system, and the computer program product further include (a) receiving, by the computer system, an input selecting one of the displayed timelines, (b) in response to the receiving the input, displaying, by the computer system, on the computer display a highlighted version of the selected one of the displayed timelines, (c) in response to the receiving the input, displaying, by the computer system, on the computer display a highlighted version of each of the displayed online messages corresponding to the selected one of the displayed timelines, and (d) in response to the receiving the input, displaying, by the computer system, on the computer display a translucent version of each of the displayed timelines not selected by the input. Referring to FIG. 5A, in a further embodiment, the present invention is further configured to perform an operation 510 of receiving, by the computer system, an input selecting one of the displayed timelines, an operation 512 of in response to the receiving the input, displaying, by the computer system, on the computer display a highlighted version of the selected one of the displayed timelines, an operation 514 of in response to the receiving the input, displaying, by the computer system, on the computer display a highlighted version of each of the displayed online messages corresponding to the selected one of the displayed timelines, and an operation 516 of in response to the receiving the input, displaying, by the computer system, on the computer display a translucent version of each of the displayed timelines not selected by the input.

In an embodiment, the computer system is a computer system 700 as shown in FIG. 7, that executes a managing and displaying online messages along timelines script or computer software application that carries out the operations of at least method 500. In an embodiment, the computer system is a computer system/server 712 as shown in FIG. 7, that executes a managing and displaying online messages along timelines script or computer software application that carries out the operations of at least method 500. In an embodiment, the computer system is a processing unit 716 as shown in FIG. 7, that executes a managing and displaying online messages along timelines script or computer software application that carries out the operations of at least method 500. In an embodiment, the computer system is a computer system 700 as shown in FIG. 7, that executes a managing and displaying online messages along timelines script or computer software application that carries out at least operations 510, 512, 514, and 516. In an embodiment, the computer system is a computer system/server 712 as shown in FIG. 7, that executes a managing and displaying online messages along timelines script or computer software application that carries out at least operations 510, 512, 514, and 516. In an embodiment, the computer system is a processing unit 716 as shown in FIG. 7, that executes a managing and displaying online messages along timelines script or computer software application that carries out at least operations 510, 512, 514, and 516.

In an embodiment, receiver 130 is configured to receive an input selecting one of the displayed timelines. In an embodiment, receiver 130 includes a computer system, such as computer system 700 as shown in FIG. 7, performing operation 510. In an embodiment, receiver 130 includes a computer system, such as computer system/server 712 as shown in FIG. 7, performing operation 510. In an embodiment receiver 130 includes a computer system, such as processing unit 716 as shown in FIG. 7, performing operation 510. In an embodiment, receiver 130 is implemented as computer software executing on a computer system, such as computer system 700 as shown in FIG. 7, such that the computer system performs operation 510. In an embodiment, receiver 130 is implemented as computer software executing on a computer system, such as computer system/server 712 as shown in FIG. 7, such that the computer system performs operation 510. In an embodiment, receiver 130 is implemented as computer software executing on a computer system, such as processing unit 716 as shown in FIG. 7 such that the computer system performs operation 510. In an embodiment, receiver 130 performs operation 510 as computer software executing on a processor of receiver 130.

In an embodiment, displayer 150 is configured to display, in response to the receiving the input, on the computer display a highlighted version of the selected one of the displayed timelines. In an embodiment, displayer 150 includes a computer system, such as computer system 700 as shown in FIG. 7, performing operation 512. In an embodiment, displayer 150 includes a computer system, such as computer system/server 712 as shown in FIG. 7, performing operation 512. In an embodiment, displayer 150 includes a computer system, such as processing unit 716 as shown in FIG. 7, performing operation 512. In an embodiment, displayer 150 is implemented as computer software executing on a computer system, such as computer system 700 as shown in FIG. 7, such that the computer system performs operation 512. In an embodiment, displayer 150 is implemented as computer software executing on a computer system, such as computer system/server 712 as shown in FIG. 7, such that the computer system performs operation 512. In an embodiment, displayer 150 is implemented as computer software executing on a computer system, such as processing unit 716 as shown in FIG. 7 such that the computer system performs operation 512. In an embodiment, displayer 150 performs operation 512 as computer software executing on a processor of displayer 150.

In an embodiment, displayer 150 is configured to display, in response to the receiving the input, on the computer display a highlighted version of each of the displayed online messages corresponding to the selected one of the displayed timelines. In an embodiment, displayer 150 includes a computer system, such as computer system 700 as shown in FIG. 7, performing operation 514. In an embodiment, displayer 150 includes a computer system, such as computer system/server 712 as shown in FIG. 7, performing operation 514. In an embodiment, displayer 150 includes a computer system, such as processing unit 716 as shown in FIG. 7, performing operation 514. In an embodiment, displayer 150 is implemented as computer software executing on a computer system, such as computer system 700 as shown in FIG. 7, such that the computer system performs operation 514. In an embodiment, displayer 150 is implemented as computer software executing on a computer system, such as computer system/server 712 as shown in FIG. 7, such that the computer system performs operation 514. In an embodiment, displayer 150 is implemented as computer software executing on a computer system, such as processing unit 716 as shown in FIG. 7 such that the computer system performs operation 514. In an embodiment, displayer 150 performs operation 514 as computer software executing on a processor of displayer 150.

In an embodiment, displayer 150 is configured to display, in response to the receiving the input, on the computer display a translucent version of each of the displayed timelines not selected by the input. In an embodiment, displayer 150 includes a computer system, such as computer system 700 as shown in FIG. 7, performing operation 516. In an embodiment, displayer 150 includes a computer system, such as computer system/server 712 as shown in FIG. 7, performing operation 516. In an embodiment, displayer 150 includes a computer system, such as processing unit 716 as shown in FIG. 7, performing operation 516. In an embodiment, displayer 150 is implemented as computer software executing on a computer system, such as computer system 700 as shown in FIG. 7, such that the computer system performs operation 516. In an embodiment, displayer 150 is implemented as computer software executing on a computer system, such as computer system/server 712 as shown in FIG. 7, such that the computer system performs operation 516. In an embodiment, displayer 150 is implemented as computer software executing on a computer system, such as processing unit 716 as shown in FIG. 7 such that the computer system performs operation 516. In an embodiment, displayer 150 performs operation 516 as computer software executing on a processor of displayer 150.

Interactive Displayed Online Messages

Figure 5B:
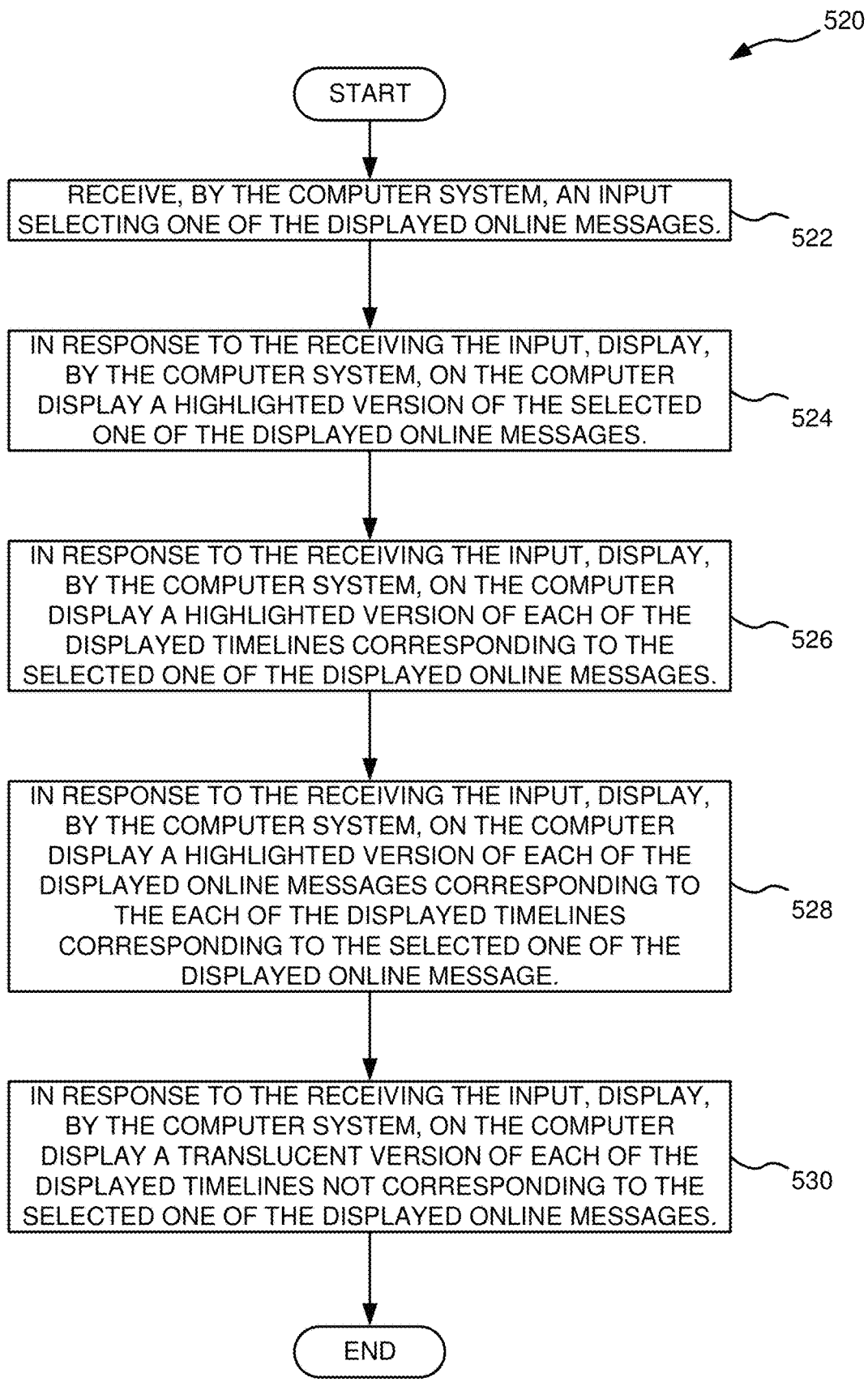
FIG. 5B depicts a flowchart in accordance with an embodiment of the present invention.

In a further embodiment, the computer implemented method, the system, and the computer program product further include (a) receiving, by the computer system, an input selecting one of the displayed online messages, (b) in response to the receiving the input, displaying, by the computer system, on the computer display a highlighted version of the selected one of the displayed online messages, (c) in response to the receiving the input, displaying, by the computer system, on the computer display a highlighted version of each of the displayed timelines corresponding to the selected one of the displayed online messages, (d) in response to the receiving the input, displaying, by the computer system, on the computer display a highlighted version of each of the displayed online messages corresponding to the each of the displayed timelines corresponding to the selected one of the displayed online message, and (e) in response to the receiving the input, displaying, by the computer system, on the computer display a translucent version of each of the displayed timelines not corresponding to the selected one of the displayed online messages. Referring to FIG. 5B, in a further embodiment, the present invention is further configured to perform an operation 522 of receiving, by the computer system, an input selecting one of the displayed online messages, an operation 524 of in response to the receiving the input, displaying, by the computer system, on the computer display a highlighted version of the selected one of the displayed online messages, an operation 526 of in response to the receiving the input, displaying, by the computer system, on the computer display a highlighted version of each of the displayed timelines corresponding to the selected one of the displayed online messages, an operation 528 of in response to the receiving the input, displaying, by the computer system, on the computer display a highlighted version of each of the displayed online messages corresponding to the each of the displayed timelines corresponding to the selected one of the displayed online message, and an operation 530 of in response to the receiving the input, displaying, by the computer system, on the computer display a translucent version of each of the displayed timelines not corresponding to the selected one of the displayed online messages.

In an embodiment, the computer system is a computer system 700 as shown in FIG. 7, that executes a managing and displaying online messages along timelines script or computer software application that carries out the operations of at least method 520. In an embodiment, the computer system is a computer system/server 712 as shown in FIG. 7, that executes a managing and displaying online messages along timelines script or computer software application that carries out the operations of at least method 520. In an embodiment, the computer system is a processing unit 716 as shown in FIG. 7, that executes a managing and displaying online messages along timelines script or computer software application that carries out the operations of at least method 520. In an embodiment, the computer system is a computer system 700 as shown in FIG. 7, that executes a managing and displaying online messages along timelines script or computer software application that carries out at least operations 522, 524, 526, 528, and 530. In an embodiment, the computer system is a computer system/server 712 as shown in FIG. 7, that executes a managing and displaying online messages along timelines script or computer software application that carries out at least operations 522, 524, 526, 528, and 530. In an embodiment, the computer system is a processing unit 716 as shown in FIG. 7, that executes a managing and displaying online messages along timelines script or computer software application that carries out at least operations 522, 524, 526, 528, and 530.

In an embodiment, receiver 130 is configured to receive an input selecting one of the displayed online messages. In an embodiment, receiver 130 includes a computer system, such as computer system 700 as shown in FIG. 7, performing operation 522. In an embodiment, receiver 130 includes a computer system, such as computer system/server 712 as shown in FIG. 7, performing operation 522. In an embodiment receiver 130 includes a computer system, such as processing unit 716 as shown in FIG. 7, performing operation 522. In an embodiment, receiver 130 is implemented as computer software executing on a computer system, such as computer system 700 as shown in FIG. 7, such that the computer system performs operation 522. In an embodiment, receiver 130 is implemented as computer software executing on a computer system, such as computer system/server 712 as shown in FIG. 7, such that the computer system performs operation 522. In an embodiment, receiver 130 is implemented as computer software executing on a computer system, such as processing unit 716 as shown in FIG. 7 such that the computer system performs operation 522. In an embodiment, receiver 130 performs operation 522 as computer software executing on a processor of receiver 130.

In an embodiment, displayer 150 is configured to display, in response to the receiving the input, on the computer display a highlighted version of the selected one of the displayed online messages. In an embodiment, displayer 150 includes a computer system, such as computer system 700 as shown in FIG. 7, performing operation 524. In an embodiment, displayer 150 includes a computer system, such as computer system/server 712 as shown in FIG. 7, performing operation 524. In an embodiment, displayer 150 includes a computer system, such as processing unit 716 as shown in FIG. 7, performing operation 524. In an embodiment, displayer 150 is implemented as computer software executing on a computer system, such as computer system 700 as shown in FIG. 7, such that the computer system performs operation 524. In an embodiment, displayer 150 is implemented as computer software executing on a computer system, such as computer system/server 712 as shown in FIG. 7, such that the computer system performs operation 524. In an embodiment, displayer 150 is implemented as computer software executing on a computer system, such as processing unit 716 as shown in FIG. 7 such that the computer system performs operation 524. In an embodiment, displayer 150 performs operation 524 as computer software executing on a processor of displayer 150.

In an embodiment, displayer 150 is configured to display, in response to the receiving the input, on the computer display a highlighted version of each of the displayed timelines corresponding to the selected one of the displayed online messages. In an embodiment, displayer 150 includes a computer system, such as computer system 700 as shown in FIG. 7, performing operation 526. In an embodiment, displayer 150 includes a computer system, such as computer system/server 712 as shown in FIG. 7, performing operation 526. In an embodiment, displayer 150 includes a computer system, such as processing unit 716 as shown in FIG. 7, performing operation 526. In an embodiment, displayer 150 is implemented as computer software executing on a computer system, such as computer system 700 as shown in FIG. 7, such that the computer system performs operation 526. In an embodiment, displayer 150 is implemented as computer software executing on a computer system, such as computer system/server 712 as shown in FIG. 7, such that the computer system performs operation 526. In an embodiment, displayer 150 is implemented as computer software executing on a computer system, such as processing unit 716 as shown in FIG. 7 such that the computer system performs operation 526. In an embodiment, displayer 150 performs operation 526 as computer software executing on a processor of displayer 150.

In an embodiment, displayer 150 is configured to display, in response to the receiving the input, on the computer display a highlighted version of each of the displayed online messages corresponding to the each of the displayed timelines corresponding to the selected one of the displayed online message. In an embodiment, displayer 150 includes a computer system, such as computer system 700 as shown in FIG. 7, performing operation 528. In an embodiment, displayer 150 includes a computer system, such as computer system/server 712 as shown in FIG. 7, performing operation 528. In an embodiment, displayer 150 includes a computer system, such as processing unit 716 as shown in FIG. 7, performing operation 528. In an embodiment, displayer 150 is implemented as computer software executing on a computer system, such as computer system 700 as shown in FIG. 7, such that the computer system performs operation 528. In an embodiment, displayer 150 is implemented as computer software executing on a computer system, such as computer system/server 712 as shown in FIG. 7, such that the computer system performs operation 528. In an embodiment, displayer 150 is implemented as computer software executing on a computer system, such as processing unit 716 as shown in FIG. 7 such that the computer system performs operation 528. In an embodiment, displayer 150 performs operation 528 as computer software executing on a processor of displayer 150.

In an embodiment, displayer 150 is configured to display, in response to the receiving the input, on the computer display a translucent version of each of the displayed timelines not corresponding to the selected one of the displayed online messages. In an embodiment, displayer 150 includes a computer system, such as computer system 700 as shown in FIG. 7, performing operation 530. In an embodiment, displayer 150 includes a computer system, such as computer system/server 712 as shown in FIG. 7, performing operation 530. In an embodiment, displayer 150 includes a computer system, such as processing unit 716 as shown in FIG. 7, performing operation 530. In an embodiment, displayer 150 is implemented as computer software executing on a computer system, such as computer system 700 as shown in FIG. 7, such that the computer system performs operation 530. In an embodiment, displayer 150 is implemented as computer software executing on a computer system, such as computer system/server 712 as shown in FIG. 7, such that the computer system performs operation 530. In an embodiment, displayer 150 is implemented as computer software executing on a computer system, such as processing unit 716 as shown in FIG. 7 such that the computer system performs operation 530. In an embodiment, displayer 150 performs operation 530as computer software executing on a processor of displayer 150.

EXAMPLE

Figure 6A:
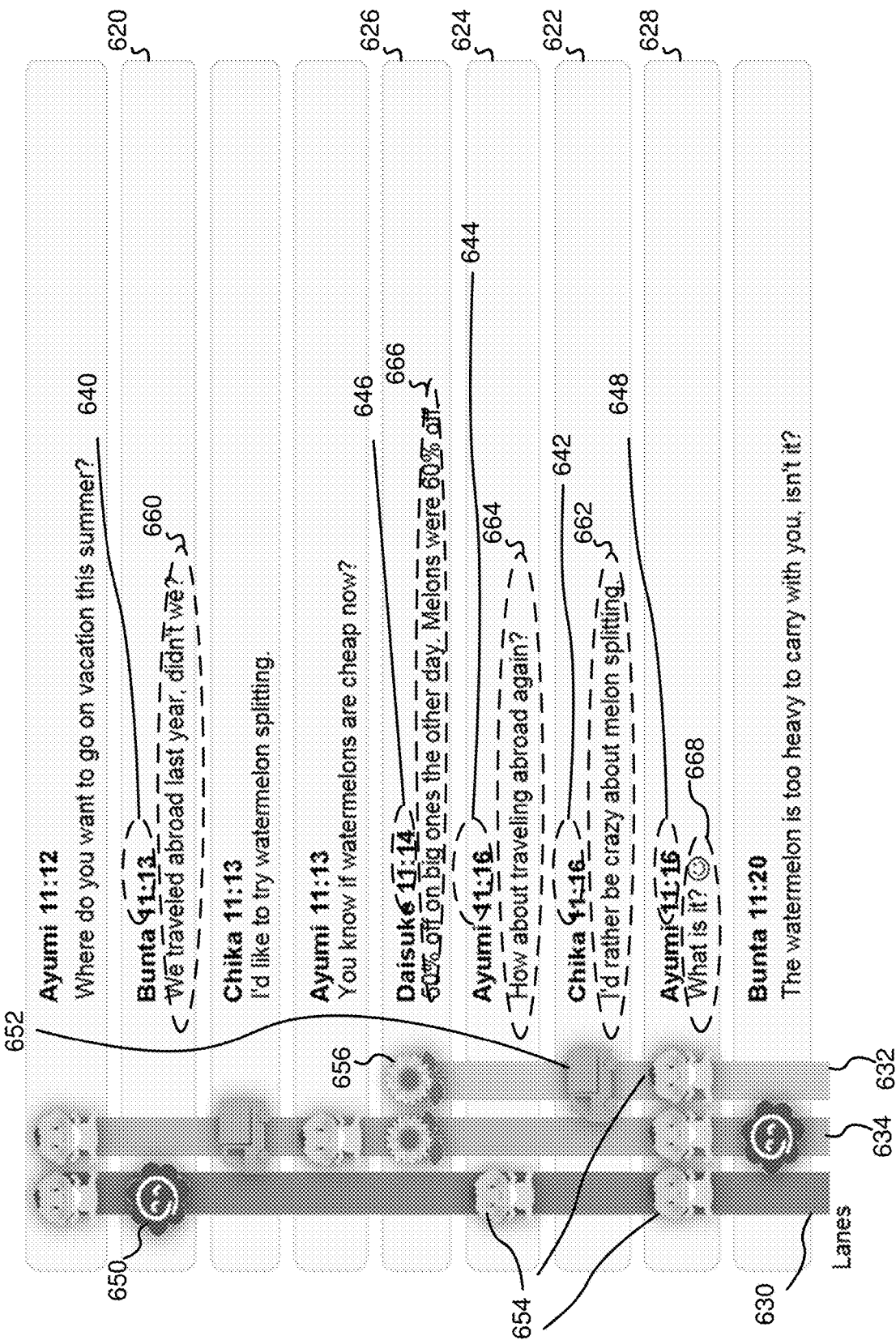
FIG. 6A depicts a graphical display in accordance with an embodiment of the present invention.

Referring to FIG. 6A, the present invention could display sets of similar online messages 620, 624, 628, and 622, 626, 628 (examples of sets of online messages 220, 224, 226, and 222, 226), along lanes 630, 632 (examples of graphical representations 230, 232) of timelines corresponding to sets of similar online messages 620, 624, 628, and 622, 626, 628. Also, for example, the present invention could display along lanes 630, 632 of the timelines corresponding to sets of similar online messages 620, 624, 628, and 622, 626, 628 along vertical axes of the computer display. In a further example, the present invention could display graphical icons 650, 654, and 652, 654, 656 (examples of graphical icons 250, 254, 256, and 252, 256) corresponding to the authors (e.g., Bunta, Ayumi, and Chika, Daisuke, Ayumi) of online messages 620, 624, 628, and 622, 626, 628 along lanes 630, 632 of the timelines corresponding to sets of similar online messages 620, 624, 628, and 622, 626, 628 according to times 640, 644, 648, and 642, 646, 648 (examples of time data 240, 244, 246, and 242, 246) of online messages 620, 624, 628, and 622, 626, 628 in chronological order on the computer display. As another example, the present invention could display text 660, 664, 668, and 662, 666, 668 (examples of text 260, 264, 266, and 262, 266) of online messages 620, 624, 628, and 622, 626, 628 along horizontal axes of the computer display at positions corresponding to the displayed graphical icons 650, 654, and 652, 654, 656 corresponding to the authors of online messages 620, 624, 628, and 622, 626, 628.

Figure 6B:
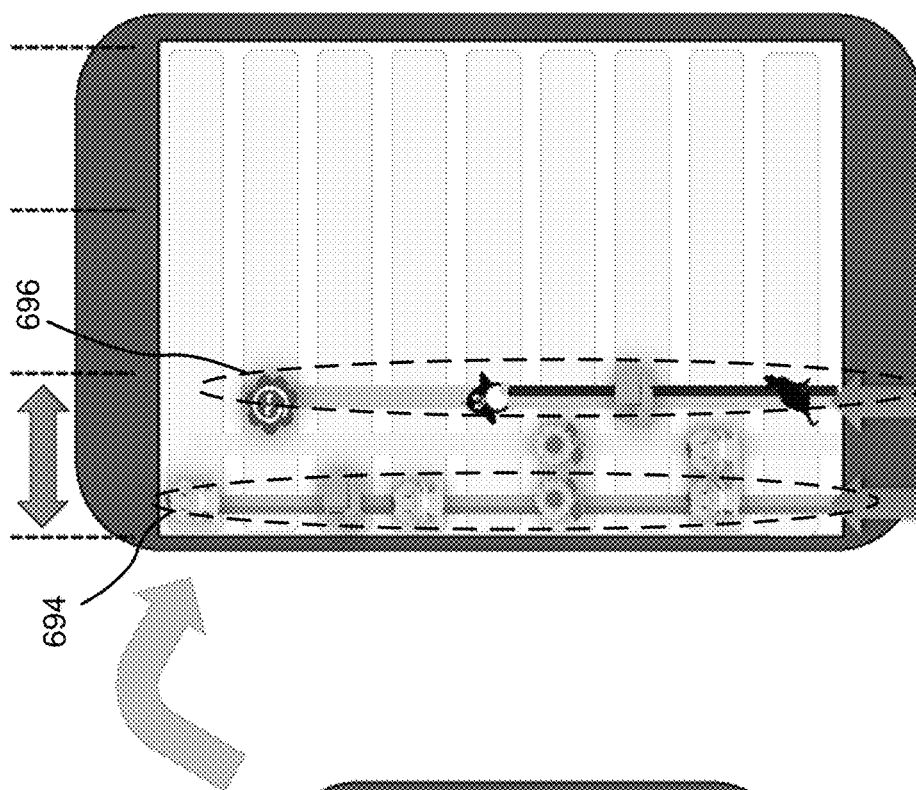
FIG. 6B depicts graphical displays in accordance with an embodiment of the present invention.
Figure 6B:
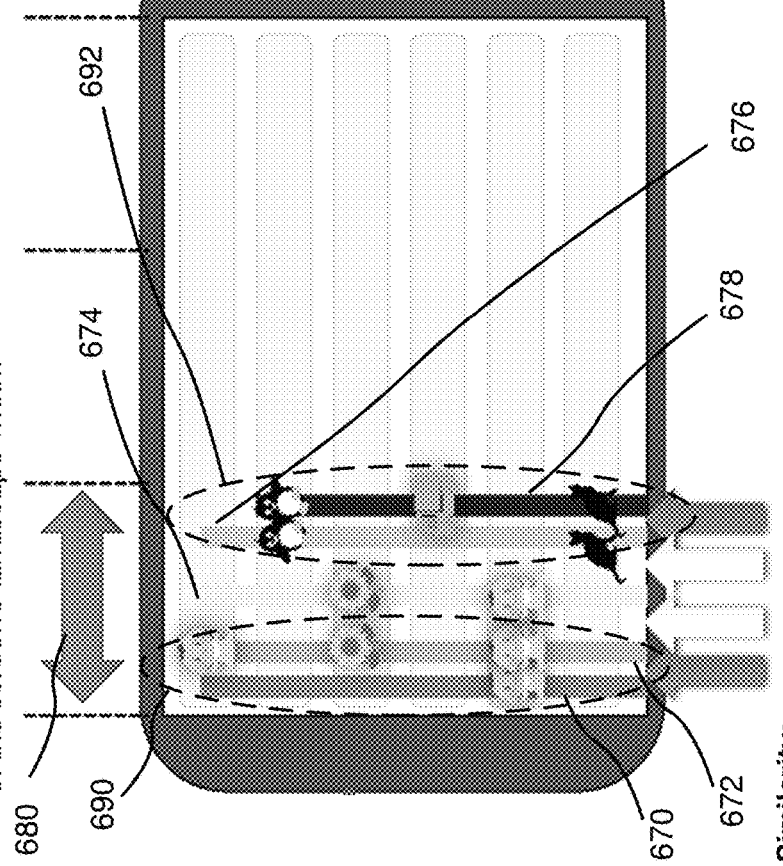

Referring to FIG. 6B, the present invention could display displayed lanes/timelines 670, 672, 674, 676, 678, on the computer display such that a combined width 680 of the displayed lanes 670, 672, 674, 676, 678 is less than or equal to a width of the computer display in response to the computer display displaying the displayed lanes 670, 672, 674, 676, 678. Also, for example, the present invention could (a) calculate, for each pair 690, 692 of the displayed lanes 670, 672, 674, 676, 678, a similarity value indicating how similar each member of the pair 690, 692 of the displayed lanes 670, 672, 674, 676, 678 is to the other member of the pair 690, 692 of the displayed lanes 670, 672, 674, 676, 678 and (b) display on the computer display the each pair 690, 692 of the displayed lanes 670, 672, 674, 676, 678 such that a horizontal distance between each member of the each pair 690, 692 of the displayed lanes 670, 672, 674, 676, 678 is inversely proportional to the calculated similarity value. In a further example, the present invention could (a) execute a set of logical operations determining whether the combined width 680 of the displayed lanes 670, 672, 674, 676, 678 would be greater than the width of the computer display when the computer display would be displaying the displayed lanes 670, 672, 674, 676, 678 and (b) display, in response to determining that the combined width 680 of the displayed lanes 670, 672, 674, 676, 678 would be greater than the width of the computer display when the computer display would be displaying the displayed lanes 670, 672, 674, 676, 678 and in response to the calculated similarity value for the members of the each pair 690, 692 of the displayed lanes 670, 672, 674, 676, 678 being greater than a threshold value, on the computer display the each pair 690, 692 of the displayed lanes 670, 672, 674, 676, 678 in an integral manner (e.g., integral displays 694, 696, respectively).

Figure 6C:
FIG. 6C depicts a graphical display in accordance with an embodiment of the present invention.

Referring to FIG. 6A and FIG. 6C, the present invention could receive an input 601 (e.g., a touch on a touch sensitive display screen of a computing device (e.g., mobile telephone, tablet computer)) selecting lane/timeline 632 among displayed lanes 630, 632, 634. Also, for example, the present invention could display, in response to receiving the input 601, on the computer display a highlighted version 602 of the selected lane 632. For example, the present invention could display, in response to receiving the input 601, on the computer display a highlighted version 612, 616, 618 of each of the displayed online messages 620, 622, 624, 626 628 corresponding to the selected lane 632. In a further example, the present invention could display, in response to receiving the input 601, on the computer display a translucent version 600, 604 of each of the displayed lanes 630, 634 not selected by the input 601. In another example, the present invention could display, in response to receiving the input 601, on the computer display a translucent version of each of the displayed online messages not corresponding to the selected lane 632.

Figure 6D:
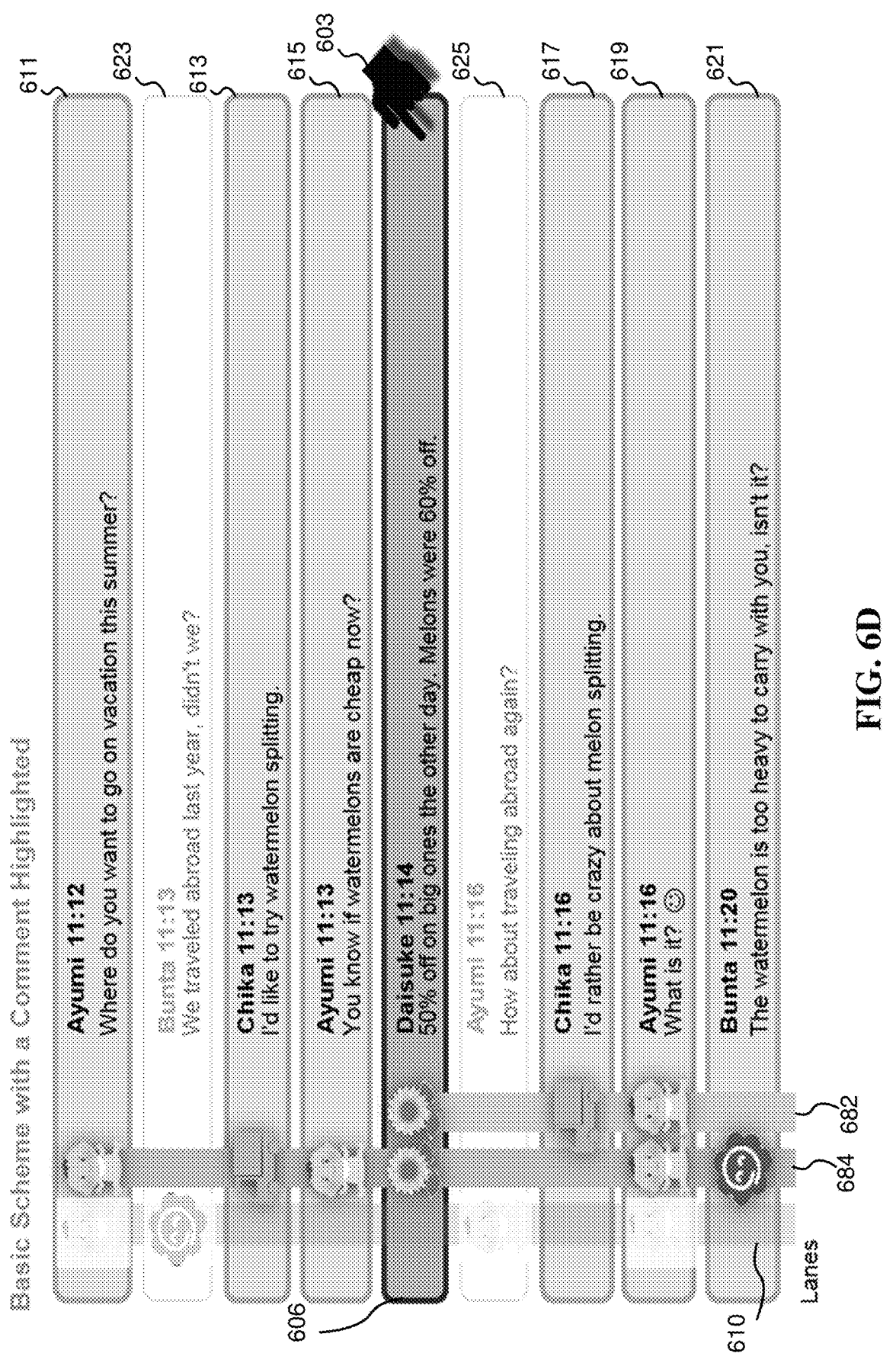

Referring to FIG. 6A and FIG. 6D, the present invention could receive an input 603 (e.g., a touch on a touch sensitive display screen of a computing device (e.g., mobile telephone, tablet computer)) selecting online message 626 among displayed online messages 620, 622, 624, 626, 628. Also, for example, the present invention could display, in response to receiving the input 603, on the computer display a highlighted version 606 of the selected online message 626. In a further example, the present invention could display, in response to receiving the input 603, on the computer display a highlighted version 682, 684 of each of the displayed lanes/timelines 630, 632, 634 corresponding to the selected online message 626. For example, the present invention could display, in response to receiving the input 603, on the computer display a highlighted version 611, 613, 615, 617, 619, 621 of each of the displayed online messages corresponding to the each of the displayed lanes 630, 632, 634 corresponding to the selected online message 626 (e.g., lanes 682, 684). In another example, the present invention could display, in response to receiving the input 603, on the computer display a translucent version 610 of each of the displayed lanes 630 not corresponding to the selected online message 626. In a further example, the present invention could display, in response to receiving the input 603, on the computer display a translucent version 623, 625 of each of the displayed online messages not selected by the input 603.

Computer System

In an exemplary embodiment, the computer system is a computer system 700 as shown in FIG. 7. Computer system 700 is only one example of a computer system and is not intended to suggest any limitation as to the scope of use or functionality of embodiments of the present invention. Regardless, computer system 700 is capable of being implemented to perform and/or performing any of the functionality/operations of the present invention.

Computer system 700 includes a computer system/server 712, which is operational with numerous other general purpose or special purpose computing system environments or configurations. Examples of well-known computing systems, environments, and/or configurations that may be suitable for use with computer system/server 712 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices.

Computer system/server 712 may be described in the general context of computer system-executable instructions, such as program modules, being executed by a computer system. Generally, program modules may include routines, programs, objects, components, logic, and/or data structures that perform particular tasks or implement particular abstract data types. Computer system/server 712 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 7, computer system/server 712 in computer system 700 is shown in the form of a general-purpose computing device. The components of computer system/server 712 may include, but are not limited to, one or more processors or processing units 716, a system memory 728, and a bus 718 that couples various system components including system memory 728 to processor 716.

Bus 718 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 712 typically includes a variety of computer system readable media. Such media may be any available media that is accessible by computer system/server 712, and includes both volatile and non-volatile media, removable and non-removable media.

System memory 728 can include computer system readable media in the form of volatile memory, such as random access memory (RAM) 730 and/or cache memory 732. Computer system/server 712 may further include other removable/non-removable, volatile/non-volatile computer system storage media. By way of example only, storage system 734 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 718 by one or more data media interfaces. As will be further depicted and described below, memory 728 may include at least one program product having a set (e.g., at least one) of program modules that are configured to carry out the functions/operations of embodiments of the invention.

Program/utility 740, having a set (at least one) of program modules 742, may be stored in memory 728 by way of example, and not limitation. Exemplary program modules 742 may include an operating system, one or more application programs, other program modules, and program data. Each of the operating system, one or more application programs, other program modules, and program data or some combination thereof, may include an implementation of a networking environment. Program modules 742 generally carry out the functions and/or methodologies of embodiments of the present invention.

Computer system/server 712 may also communicate with one or more external devices 714 such as a keyboard, a pointing device, a display 724, one or more devices that enable a user to interact with computer system/server 712, and/or any devices (e.g., network card, modem, etc.) that enable computer system/server 712 to communicate with one or more other computing devices. Such communication can occur via Input/Output (I/O) interfaces 722. Still yet, computer system/server 712 can communicate with one or more networks such as a local area network (LAN), a general wide area network (WAN), and/or a public network (e.g., the Internet) via network adapter 720. As depicted, network adapter 720 communicates with the other components of computer system/server 712 via bus 718. It should be understood that although not shown, other hardware and/or software components could be used in conjunction with computer system/server 712. Examples, include, but are not limited to: microcode, device drivers, redundant processing units, external disk drive arrays, RAID systems, tape drives, and data archival storage systems.

Cloud Computing

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 8:
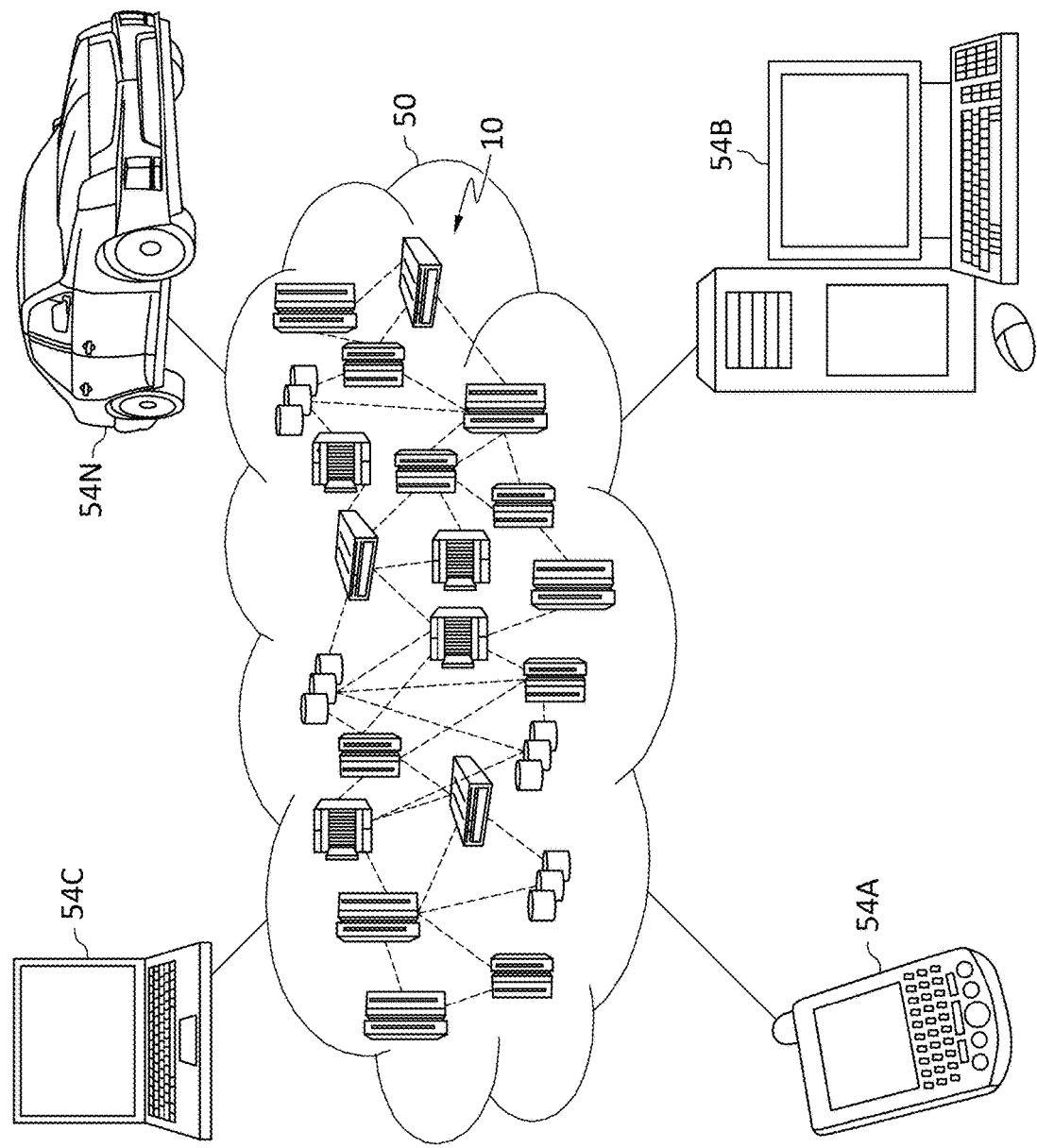
FIG. 8 depicts a cloud computing environment according to various embodiments of the present invention.

Referring now to FIG. 8, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 8 are intended to be illustrative only and that computing nodes 10 and cloud computing environment 50 can communicate with any type of computerized device over any type of network and/or network addressable connection (e.g., using a web browser).

Figure 9:
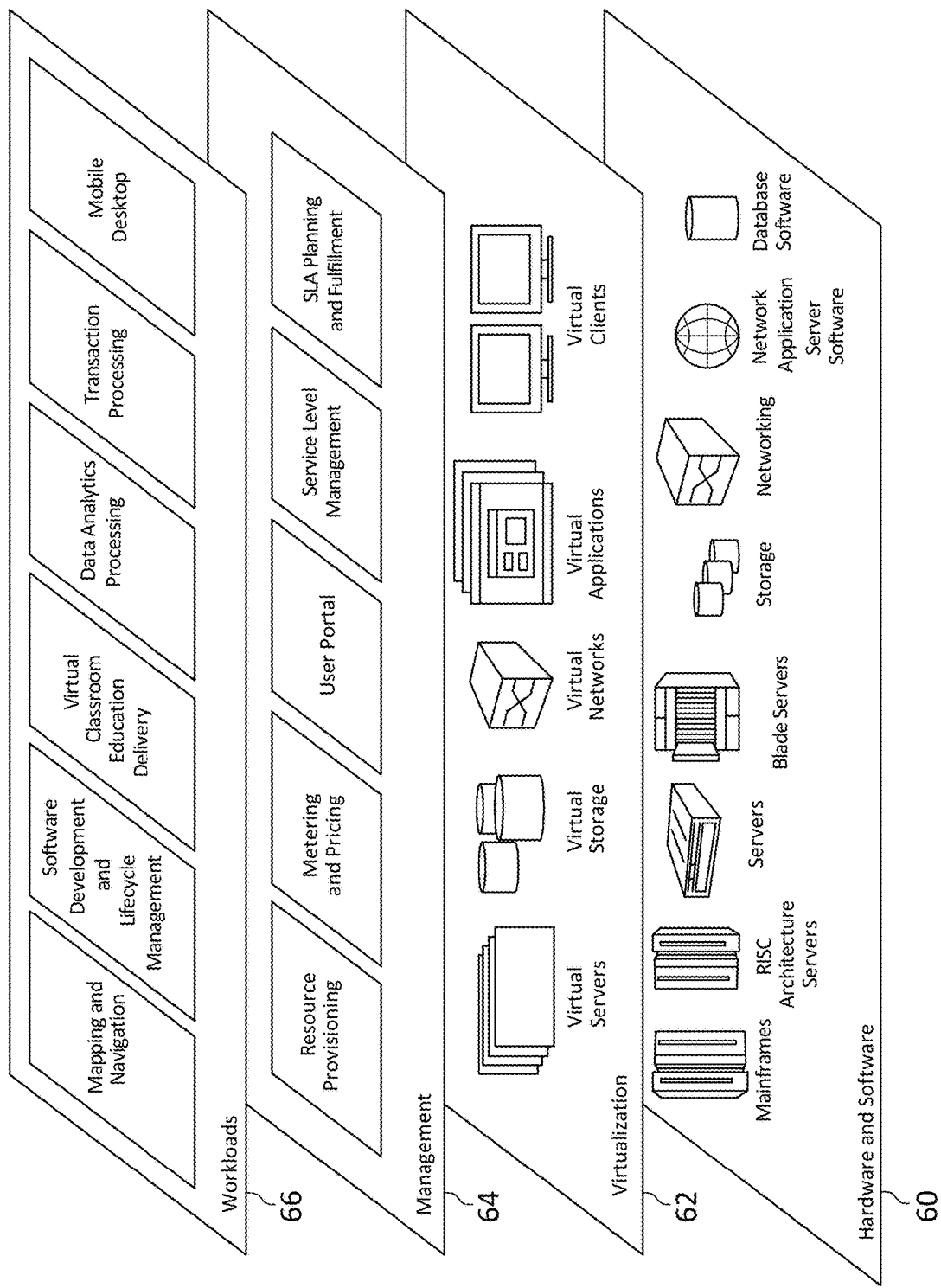
FIG. 9 depicts abstraction model layers according to various embodiments of the present invention.

Referring now to FIG. 9, a set of functional abstraction layers provided by cloud computing environment 50 is shown. It should be understood in advance that the components, layers, and functions shown in FIG. 9 are intended to be illustrative only and embodiments of the invention are not limited thereto. As depicted, the following layers and corresponding functions are provided:

Hardware and software layer 60 includes hardware and software components. Examples of hardware components include: mainframes; RISC (Reduced Instruction Set Computer) architecture based servers; storage devices; networks and networking components. In some embodiments, software components include network application server software.

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and mobile desktop.

Computer Program Product

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A computer implemented method comprising:
    receiving, by a computer system, a plurality of online messages from an online website;
    executing, by the computer system, a set of logical operations determining sets of similar online messages among the plurality of online messages;
    displaying, by the computer system, on a computer display each of the sets of similar online messages along a graphical representation of a timeline corresponding to the each of the sets of similar online messages, resulting in displayed timelines and displayed online messages;

receiving, by the computer system, an input selecting one of the displayed timelines;

in response to the receiving the input, displaying, by the computer system, on the computer display a highlighted version of the selected one of the displayed timelines;

in response to the receiving the input, displaying, by the computer system, on the computer display a highlighted version of each of the displayed online messages corresponding to the selected one of the displayed timelines; and in response to the receiving the input, displaying, by the computer system, on the computer display a translucent version of each of the displayed timelines not selected by the input.

2. The method of claim 1 wherein the executing the set of logical operations determining the sets of similar online messages comprises clustering similar online messages among the plurality of online messages into the sets of similar online messages.

3. The method of claim 1 wherein the displaying on the computer display the each of the sets of similar online messages comprises:

displaying the graphical representation of the timeline corresponding to the each of the sets of similar online messages along a vertical axis of the computer display;

for each online message in the each of the sets of similar online messages, displaying a graphical icon corresponding to an author of the each online message along the graphical representation of the timeline corresponding to the each of the sets of similar online messages according to time data of the each online message in chronological order on the computer display; and for the each online message, displaying text of the each online message along a horizontal axis of the computer display at a position corresponding to the displayed graphical icon corresponding to the author of the each online message.

4. The method of claim 1 further comprising:

in response to receiving, by the computer system, a new online message from the online website, executing, by the computer system, a set of logical operations determining each set among the sets of similar online messages to which the new online message is similar; and in response to determining, by the computer system, the each set among the sets of similar online messages to which the new online message is similar, displaying, by the computer system, on the computer display the new online message, resulting in a displayed new online message.

5. The method of claim 4 wherein the executing the set of logical operations determining the each set among the sets of similar online messages to which the new online message is similar comprises:

for the each of the sets of similar online messages, calculating a similarity value of the new online message, wherein the calculated similarity value indicates a degree of similarity of the new online message to the each of the sets of similar online messages, resulting in similarity values of the new online message; and for each of the calculated similarity values that is greater than a threshold value, associating the new online message with a corresponding set of similar online messages among the sets of similar online messages, resulting in associated sets of similar online messages.

6. The method of claim 5 wherein the displaying on the computer display the new online message comprises:

for each of the associated sets of similar online messages, displaying a graphical icon corresponding to an author of the new online message along a displayed timeline, among the displayed timelines, corresponding to the each of the associated sets of similar online messages according to time data of the new online message in chronological order on the computer display; and for each of the associated sets of similar online messages, displaying text of the new online message along a horizontal axis of the computer display at a position corresponding to the displayed graphical icon corresponding to the author of the new online message.

7. The method of claim 5 wherein the displaying on the computer display the new online message comprises for each of the calculated similarity values that is less than or equal to the threshold value, displaying on the computer display the new online message along a graphical representation of a timeline according to time data of the new online message in chronological order.

8. The method of claim 1 further comprising displaying, by the computer system, the displayed timelines on the computer display such that a combined width of the displayed timelines is less than or equal to a width of the computer display in response to the computer display displaying the displayed timelines.

9. The method of claim 1 further comprising:

receiving, by the computer system, an input selecting one of the displayed online messages;

in response to the receiving the input, displaying, by the computer system, on the computer display a highlighted version of the selected one of the displayed online messages;

in response to the receiving the input, displaying, by the computer system, on the computer display a highlighted version of each of the displayed timelines corresponding to the selected one of the displayed online messages;

in response to the receiving the input, displaying, by the computer system, on the computer display a highlighted version of each of the displayed online messages corresponding to the each of the displayed timelines corresponding to the selected one of the displayed online messages; and in response to the receiving the input, displaying, by the computer system, on the computer display a translucent version of each of the displayed timelines not corresponding to the selected one of the displayed online messages.

10. A system comprising:

a memory; and a processor in communication with the memory, the processor configured to perform a method, by executing software instructions, comprising, receiving a plurality of online messages from an online website, executing a set of logical operations determining sets of similar online messages among the plurality of online messages, displaying on a computer display each of the sets of similar online messages along a graphical representation of a timeline corresponding to the each of the sets of similar online messages, resulting in displayed timelines and displayed online messages;

receiving, by the computer system, an input selecting one of the displayed timelines; in response to the receiving the input, displaying, by the computer system, on the computer display a highlighted version of the selected one of the displayed timelines; and in response to the receiving the input, displaying, by the computer system, on the computer display a highlighted version of each of the displayed online messages corresponding to the selected one of the displayed timelines; and in response to the receiving the input, displaying, by the computer system, on the computer display a translucent version of each of the displayed timelines not selected by the input.

11. The system of claim 10 wherein the executing the set of logical operations determining the sets of similar online messages comprises clustering similar online messages among the plurality of online messages into the sets of similar online messages.

12. The system of claim 10 wherein the displaying on the computer display the each of the sets of similar online messages comprises:

displaying the graphical representation of the timeline corresponding to the each of the sets of similar online messages along a vertical axis of the computer display;

for each online message in the each of the sets of similar online messages, displaying a graphical icon corresponding to an author of the each online message along the graphical representation of the timeline corresponding to the each of the sets of similar online messages according to time data of the each online message in chronological order on the computer display; and for the each online message, displaying text of the each online message along a horizontal axis of the computer display at a position corresponding to the displayed graphical icon corresponding to the author of the each online message.

13. The system of claim 10 wherein the method further comprises:

in response to receiving, a new online message from the online website, executing a set of logical operations determining each set among the sets of similar online messages to which the new online message is similar; and in response to determining the each set among the sets of similar online messages to which the new online message is similar, displaying on the computer display the new online message, resulting in a displayed new online message.

14. The system of claim 10 wherein the method further comprises displaying the displayed timelines on the computer display such that a combined width of the displayed timelines is less than or equal to a width of the computer display in response to the computer display displaying the displayed timelines.

15. A computer program product comprising a computer readable storage medium having program instructions embodied therewith, the program instructions executable by a processor to cause the processor to perform a method comprising:

receiving a plurality of online messages from an online website;

executing a set of logical operations determining sets of similar online messages among the plurality of online messages;

displaying on a computer display each of the sets of similar online messages along a graphical representation of a timeline corresponding to the each of the sets of similar online messages, resulting in displayed timelines and displayed online messages;

receiving, by the computer system, an input selecting one of the displayed timelines; in response to the receiving the input, displaying, by the computer system, on the computer display a highlighted version of the selected one of the displayed timelines;

in response to the receiving the input, displaying, by the computer system, on the computer display a highlighted version of each of the displayed online messages corresponding to the selected one of the displayed timelines; and in response to the receiving the input, displaying, by the computer system, on the computer display a translucent version of each of the displayed timelines not selected by the input.

16. The computer program product of claim 15 wherein the executing the set of logical operations determining the sets of similar online messages comprises clustering similar online messages among the plurality of online messages into the sets of similar online messages.

17. The computer program product of claim 15 wherein the displaying on the computer display the each of the sets of similar online messages comprises:

displaying the graphical representation of the timeline corresponding to the each of the sets of similar online messages along a vertical axis of the computer display;

for each online message in the each of the sets of similar online messages, displaying a graphical icon corresponding to an author of the each online message along the graphical representation of the timeline corresponding to the each of the sets of similar online messages according to time data of the each online message in chronological order on the computer display; and for the each online message, displaying text of the each online message along a horizontal axis of the computer display at a position corresponding to the displayed graphical icon corresponding to the author of the each online message.

* * * * *